(12) United States Patent
Utsumi et al.

(10) Patent No.: US 6,757,044 B2
(45) Date of Patent: Jun. 29, 2004

(54) LIQUID CRYSTAL DISPLAY DEVICE WITH SPACERS CONTROLLING THICKNESS OF LIQUID CRYSTAL LAYER

(75) Inventors: Yuka Utsumi, Hitachi (JP); Yasushi Tomioka, Hitachi (JP); Masatoshi Wakagi, Hitachi (JP); Yasunari Maekawa, Takasaki (JP); Sukekazu Aratani, Hitachiota (JP); Katsumi Kondo, Mito (JP); Shigeru Matsuama, Mobara (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 10/189,427

(22) Filed: Jul. 8, 2002

(65) Prior Publication Data

US 2003/0002005 A1 Jan. 2, 2003

Related U.S. Application Data

(62) Division of application No. 09/239,521, filed on Jan. 29, 1999, now Pat. No. 6,441,880.

(30) Foreign Application Priority Data

Jan. 30, 1998 (JP) .............................. 10-018530
Feb. 12, 1998 (JP) .............................. 10-029504

(51) Int. Cl.$^7$ ............................. G02F 1/1337
(52) U.S. Cl. ....................... 349/155; 349/132
(58) Field of Search .............. 349/155, 156, 349/141, 123, 132

(56) References Cited

U.S. PATENT DOCUMENTS 4,341,445 A    7/1982  Matsuyama et al.
5,503,932 A    4/1996  Sakai et al.
5,576,862 A   11/1996  Sugiyama et al.
5,602,661 A    2/1997  Schadt et al.
5,680,189 A   10/1997  Shimizu et al.
5,909,265 A    6/1999  Kim et al.
5,982,466 A   11/1999  Choi et al.
5,995,186 A   11/1999  Hiroshi
5,995,191 A   11/1999  Tamai et al.
6,091,476 A    7/2000  Sakai et al.
6,097,467 A    8/2000  Fujimaki et al.

FOREIGN PATENT DOCUMENTS

| | | |
|---|---|---|
| JP | 4-177324 | 6/1992 |
| JP | 5-142549 | 6/1993 |
| JP | 7-056148 | 3/1995 |
| JP | 7-253562 | 10/1995 |
| JP | 8-136935 | 5/1996 |
| JP | 8-146433 | 6/1996 |
| JP | 9-080391 | 3/1997 |
| JP | 9-274175 | 10/1997 |
| JP | 9-278735 | 10/1997 |
| JP | 9-281507 | 10/1997 |
| JP | 9-316032 | 12/1997 |

*Primary Examiner*—Kenneth Parker
(74) *Attorney, Agent, or Firm*—Antonelli, Terry, Stout & Kraus, LLP

(57) ABSTRACT

A normally closed liquid crystal display device using an in-plane switching mode prevented from light leakage caused by spacer beads and having a high contrast ratio can be produced by making a pretilt angle between an alignment control film and liquid crystals 4° or less and controlling a light leakage centering the spacer in 4-divided shapes; or by placing a film provided with a liquid crystal alignment controlling function by irradiation with polarized light between the spacer and a liquid crystal layer, the spacer being present in a pair of substrates.

20 Claims, 16 Drawing Sheets

FIG.6A
FIG.6C
FIG.6B
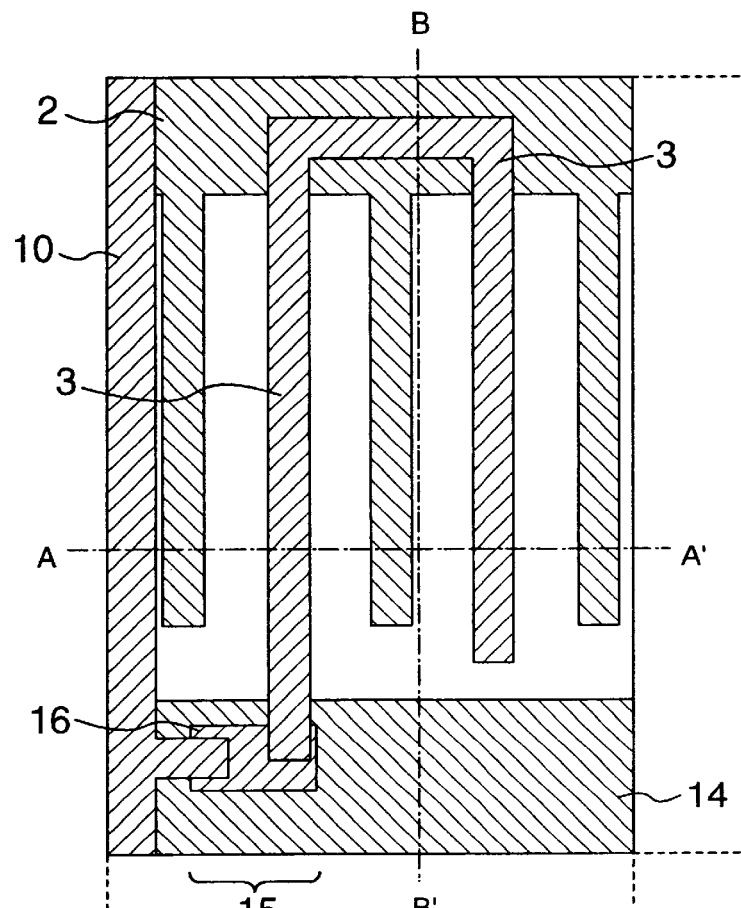
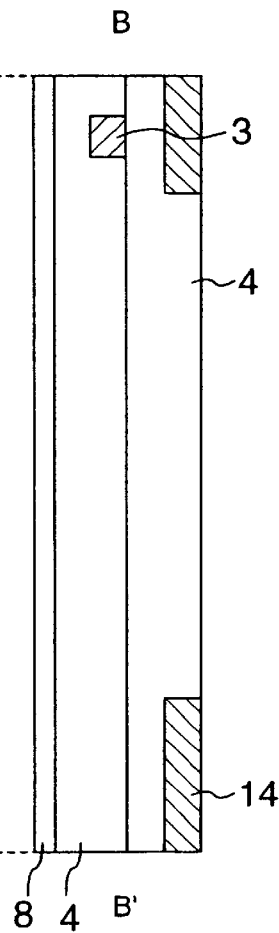
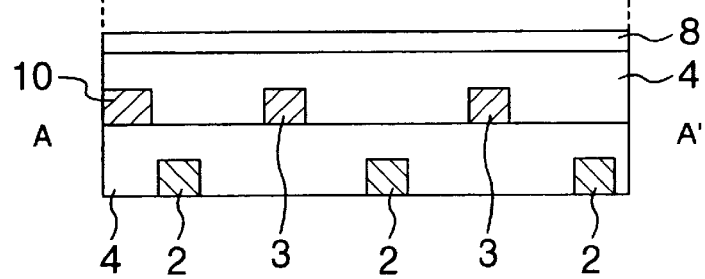

FIG.15A
FIG.15C
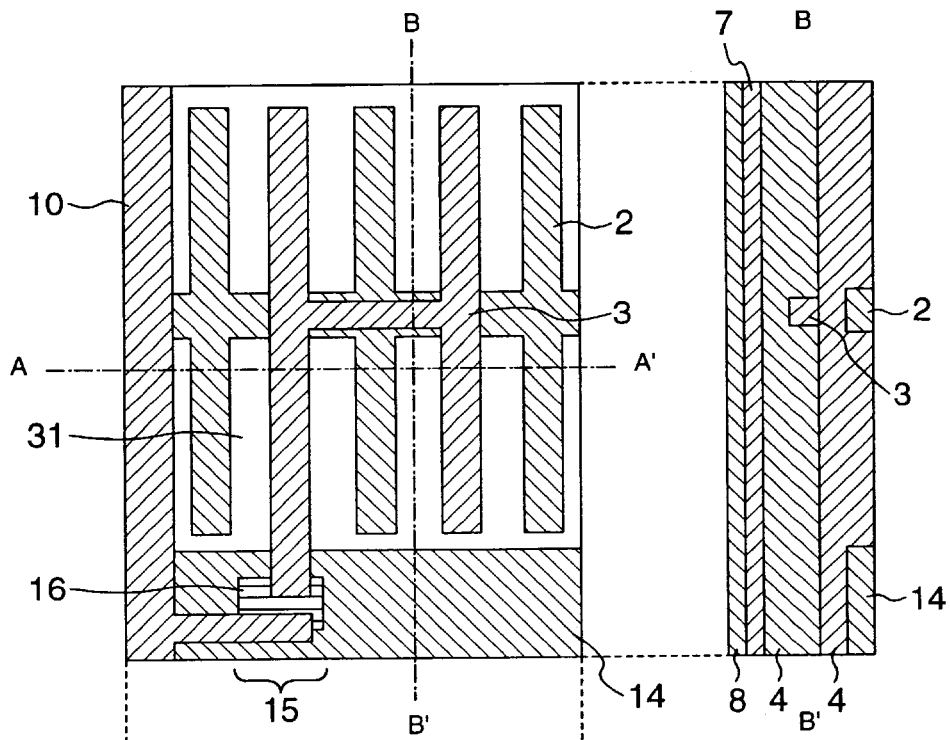
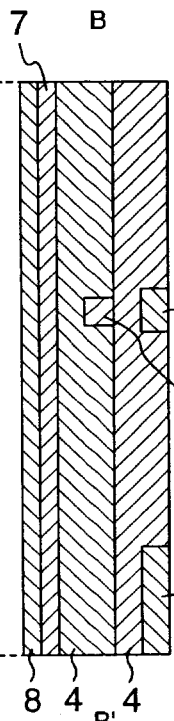
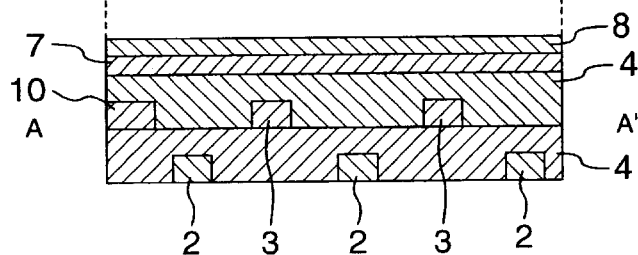
FIG.15B

LIQUID CRYSTAL DISPLAY DEVICE WITH SPACERS CONTROLLING THICKNESS OF LIQUID CRYSTAL LAYER

CROSS REFERENCE TO RELATED APPLICATION

This is a divisional of U.S. application Ser. No. 09/239,521, filed Jan. 29, 1999 now U.S. Pat. No. 6,441,880, the subject matter of which is incorporated by reference herein.

BACKGROUND OF THE INVENTION

The present invention relates to a normally closed liquid crystal display device, particularly to such a liquid crystal display device incorporating an in-plane switching (IPS) mode which is operated by applying an electric field to the liquid crystal layer in the direction substantially parallel to the substrate plane.

In liquid crystal display devices, the dark level of dark display is a decisive factor for the contrast ratio. The principal causes of worsening the dark level of dark display are the improper conditions of pixel and electrode ends, low frame response and light leakage at the periphery of the spacer.

Variations in thickness of the liquid crystal layer in these liquid crystal display devices lead to serious deterioration of display qualities such as reduction of contrast, nonuniformity of luminance and color shading, so that the spacers are required for keeping the uniform thickness of the liquid crystal layer.

Provision of such spacers, however, is causative of light leakage as it disturbs alignment of the liquid crystal molecules around the spacer surface. The higher the in-plane distribution density of spacers, the more effective for suppressing variation of thickness of the liquid crystal layer, but at the same time this may invite a greater decrease of contrast ratio. Also, light leakage at the periphery of the spacer tends to provoke a sense of glaringness which hinders appearance of uniform blackness of the picture when the display mode changes from dark to gray scale, and may also cause nonuniformity of luminance due to localized distribution of the spacers.

In the normally closed liquid crystal display devices of the twisted nematic (TN) mode in which an electric field is applied along the direction perpendicular to the substrates, a method for minimizing light leakage at the spacer periphery by incorporating a mechanism for vertically aligning the liquid crystal molecules in the spacer surface has been proposed (JP-A-4-177324, etc.). This method is indeed effective in the normally closed liquid crystal display devices of the TN mode, but no disclosure is made on the technique for reducing or eliminating light leakage which occurs specifically in the IPS mode normally closed liquid crystal display devices to which the conception of the present invention is directed.

SHORT SUMMARY OF THE INVENTION

An object of the present invention is to provide an IPS mode normally closed liquid crystal display device of high contrast ratio, which is freed of the problem of light leakage caused by the spacer beads in this type of liquid crystal display devices.

Accordingly, the present invention provides an IPS mode normally closed liquid crystal display device comprising:

a pair of substrates at least one of which is transparent, a liquid crystal layer disposed between said pair of substrates, a group of electrodes for applying to said liquid crystal layer an electric field substantially parallel to the substrate plane and one or more active elements connected to said electrodes, said group of electrodes and active elements being formed on one of said pair of substrates, an alignment control film formed on said pair of substrates, and an optical means for changing the optical properties according to the state of molecular alignment of said liquid crystal layer, wherein the thickness of said liquid crystal layer is controlled to be substantially uniform by the spacer beads dispersed and held between said pair of substrates, a pretilt angle between said alignment control film and liquid crystals is 4° or less, and a contact angle between said liquid crystals and said spacer is 0° to 60°.

The present invention also provides a liquid crystal display device of the type recited, which is freed of the problem of light leakage due to the presence of the spacer beads by disposing between said spacer and said liquid crystal layer a film provided with a liquid crystal alignment controlling function by irradiation with polarized light.

BRIEF DESCRIPTION OF THE DRAWINGS

These and other objects and features of the present invention will be understood more clearly from the following detailed description with reference to the accompanying drawings, wherein:

FIGS. 6A to 6C are a schematic plane view (6A) and schematic sectional views (6B and 6C) showing a group of electrodes (structure), an insulating film and an alignment control film in a unitary pixel section in an embodiment of the present invention.

FIGS. 15A to 15C are schematic side sectional illustrations of a liquid crystal display device in an embodiment of the present invention.

DETAILED DESCRIPTION OF THE INVENTION

Figure 1:
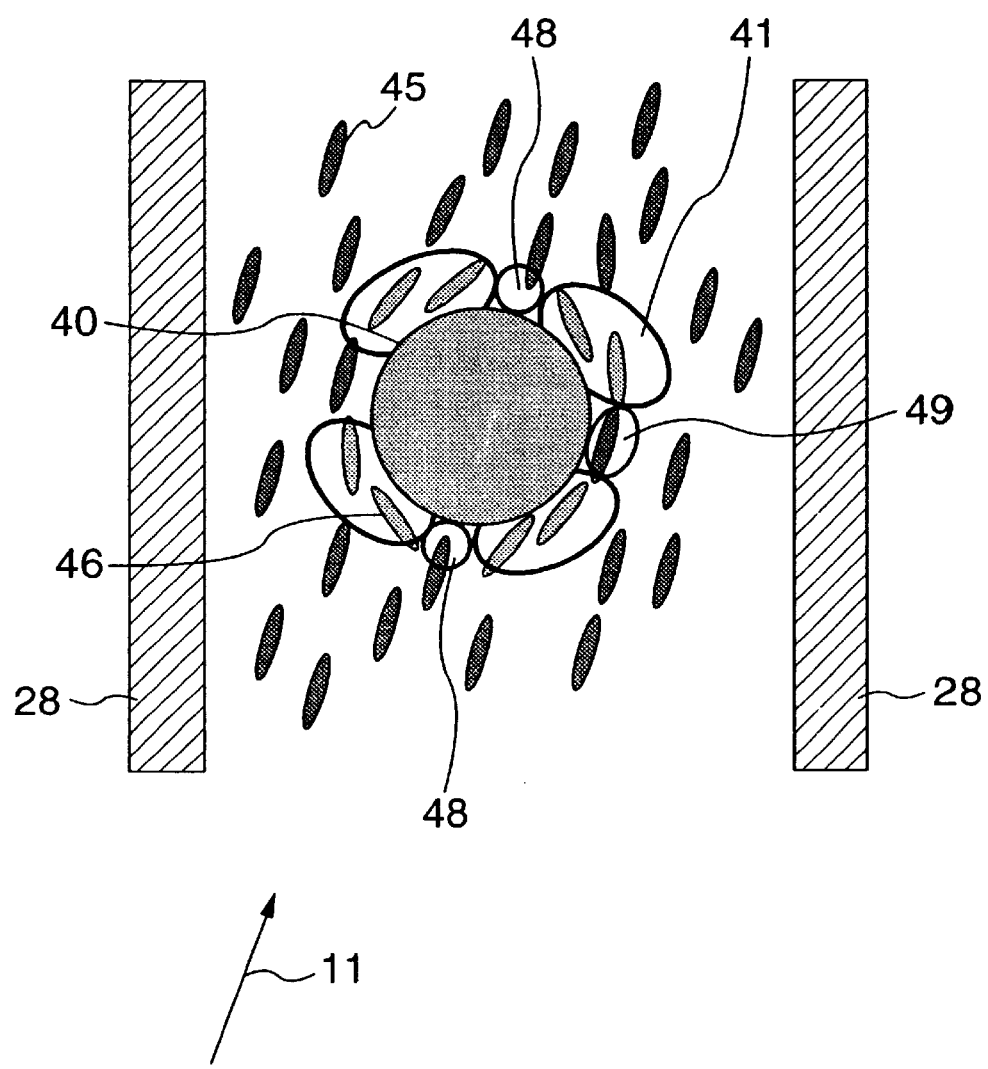
FIG. 1 is a schematic illustration of 4-division alignment of the liquid crystal molecules around a spacer bead in a liquid crystal display device according to the present invention.

In the conventional TN mode normally open liquid crystal display devices, dark display is obtained in a state where a high voltage is applied. In this case, most of the liquid crystal molecules are aligned in the direction of the electric field which is normal to the substrate surface, and the black level is obtained under a specific relationship between the alignment of liquid crystal molecules and the disposition of polarizer. Therefore, uniformity of the black level is, in principle, not much dependent on the state of initial alignment under low voltage.

Further, the human eye recognizes the nonuniformity of luminance as a relative ratio of luminance and shows a reaction close to logarithmic scale, so that it is sensitive to the variation of black level. In this connection, the conventional TN mode normally open liquid crystal display devices, in which the liquid crystal molecules are forcibly aligned in one direction under high voltage, are insensitive to the state of initial alignment and advantageous in this respect.

On the other hand, the IPS mode normally closed liquid crystal display devices are very sensitive to disturbance of the state of initial alignment as the black level is displayed at low or zero voltage in these display devices. Particularly in the configuration of birefrigent mode in which the liquid crystal molecules take homogeneous alignment, i.e. they are aligned parallel to each other on the upper and lower substrates, and wherein one of the polarizers is arranged so that its light transmission axis will be parallel to the direction of alignment of the liquid crystal molecules while the other polarizer is arranged orthogonal thereto, the polarized light incident on the liquid crystal layer is allowed to propagate with little disturbance of linear polarization. This is effective for darkening black the dark level and allows ideal black display in principle.

Ideal black display in principle is indeed realized, but on the other hand, only slight disturbance of initial alignment may directly lead to the initiation of light leakage, causing impediment of darkness in black display and degradation of the black level.

Transmittance T in the birefrigent mode in an IPS mode liquid crystal display devices is generally given by the following equation (1):

$$T = T0 \cdot \sin 2\{2\theta(E)\} \cdot \sin 2\{(\pi \cdot \text{deff} \cdot \Delta n)/\lambda\} \quad (1)$$

wherein T0 is a factor, which is a numerical value decided mainly by transmittance of the polarizer used in the liquid crystal panel, $\theta(E)$ is the angle made by the effective optical axis of the liquid crystal layer with the polarized light transmission axis, $\Delta n$ is liquid crystal refractive anisotropy, and $\lambda$ is light wavelength. Here, the product of effective thickness deff of the liquid crystal layer and liquid crystal refractive anisotropy $\Delta n$, i.e. deff·$\Delta n$, is called retardation. Crystal layer thickness deff indicates the thickness of only the liquid crystal layer which actually changes its direction of alignment when an electric voltage is applied, and does not express the thickness of the whole liquid crystal layer, because the liquid crystal molecules around the interface of the liquid crystal layer won't be changed in their direction of alignment, under the influence of interfacial anchorage, even when an electric voltage is applied. Therefore, when the thickness of the whole liquid crystal layer held between a pair of substrates is represented by dLC, there always exists the relation of deff<dLC, and their difference can be estimated to be approximately 20 to 40 nm though variable depending on certain factors such as the material used for the liquid crystal panel and the material forming the interface with the liquid crystal layer, for example, the alignment film material.

As is seen from the above equation (1), what is dependent on the strength of electric field is the member sin $2\{2\theta(E)\}$ in the above equation, and luminance can be adjusted by varying the angle $\theta$ in accordance with the electric field strength. For making a normally closed liquid crystal display device, the polarizers are set such that $\theta$ will become 0° ($\theta=0$) when no electric voltage is applied, so that this display system is designed to be sensitive to disturbance in the direction of initial alignment.

Thus, in the IPS mode normally closed liquid crystal display devices which are sensitively to the disturbance in the direction of initial alignment, the main cause of retardation of darkness of dark display is light leakage that occurs at the periphery of the spacer, because such light leakage causes the liquid crystal molecules in the spacer surface to get aligned contrary to the action of the alignment control film which works to align the liquid crystal molecules in the specified direction.

The above phenomenon—that the spacer interface functions like an alignment control film to cause contrary alignment of the liquid crystal molecules—is not the only case with the IPS mode. However, as mentioned above, the TN mode normally closed liquid crystal display devices are not much affected by light leakage caused by disturbance in the direction of initial alignment. Also, in the TN mode normally closed liquid crystal display devices, means are incorporated for letting the liquid crystal molecules align vertically on the spacer bead surface. This seems to be for the following reason.

When the liquid crystal molecules are aligned parallel to the spacer bead surface, this is an equal value as to whether they are parallel or vertical to the substrate. In the TN mode normally closed liquid crystal displays, an electric field is applied in the direction vertical to the substrates to operate the display system so that the liquid crystal molecules will be aligned parallel to the direction of electric field, so that the disturbance of alignment in the polar direction triggers a fatal increase of light leakage. In other words, since in the TN mode the liquid crystal molecules rise up in the polar direction when the system is operated, such state of rise-up in the polar direction is equal to parallel alignment when viewed from the spacer bead/liquid crystal interface, and is stabilized as is. It is, therefore, almost impossible to control the liquid crystal molecules to take parallel alignment which can prevent them from rising up in the polar direction. So, in the prior art, it has been tried to provide the spacer beads with a vertically aligning function. This is designed to instabilize the rise-up of the liquid crystal molecules in the polar direction where light leakage is most likely to occur.

In the case of the IPS mode, however, although rise-up in the polar direction gives no influence on light leakage, disturbance of alignment in the azimuthal direction forces to cause a fatal increase of light leakage. The spacer beads with disposition to vertical alignment tend to cause deviation of alignment in the azimuthal direction, so that when such vertical alignment-oriented spacer beads used in the TN mode liquid crystal displays are applied to the IPS mode liquid crystal displays, there results in an increase of light leakage. It is thus impossible with the conventional techniques to lessen light leakage around the spacer beads in the IPS normally closed liquid crystal displays.

This is the problem which is not encountered in the STN mode where the same birefrigent mode is employed, so it is required to contrive a means of solution peculiar to the liquid crystal display devices employing the IPS mode in which an electric field is generated in the transverse direction.

The present inventors have made further researches on the cause of light leakage around the spacer beads and found that the following factors are involved in the matter of light leakage caused by the spacer beads.

One factor is that high light leakage around the spacer beads impedes darkness of dark display to worsen the black level. Another factor concerns the facts that the degree of light leakage differs among the spacer beads, and that local concentration of the spacer beads causing high light leakage induces nonuniformity or irregularity of luminance.

Therefore, although it is of course a matter of concern to lessen light leakage itself around the spacer beads, it is also an important subject for study to device means for allowing their uniform in-plane distribution.

Further, in the IPS mode liquid crystal display device, when a pretilt angle between the alignment control film and the liquid crystals becomes higher, there is a problem in that the wide viewing angle of the IPS mode liquid crystal display, which is one of characteristics, is damaged. Particularly when the pretilt angle is more than 4°, the viewing angle properties are rapidly narrowed, so that it is found that particularly the wide viewing angle is preferable when the pretilt angle is made 3° or less (Ohe, et al: Liquid Crystals vol. 22, no. 4, p391, 1997).

It is an object of the present invention to provide a liquid crystal display device of high contrast ratio, which is freed of the said problem of light leakage associated with the spacer beads in the IPS mode normally closed liquid crystal display devices.

More specifically, the present invention envisions to provide a normally closed liquid crystal display device, especially an active-matrix liquid crystal display device employing the in-plane switching mode, and having a pretilt angle between an alignment control film and liquid crystals of 4° or less, characterized in that light leakage centering around each spacer is controlled to be divided into four shapes.

Embodiments of the present invention are described below:

(1) A normally closed liquid crystal display device comprising:
a pair of substrates at least one of which is transparent,
a liquid crystal layer disposed between said pair of substrates,
a group of electrodes for applying to said liquid crystal layer an electric field substantially parallel to the substrate plane and one or more active elements connected to said electrodes, said group of electrodes and active elements being formed on one of said pair of substrates,
an alignment control film formed on said pair of substrates, and
an optical means for changing the optical properties according to the state of molecular alignment of said liquid crystal layer,
wherein the thickness of said liquid crystal layer is controlled to be substantially uniform by the spacer beads dispersed and held between said pair of substrates, a pretilt angle between said alignment control film and liquid crystals is 4° or less, and a contact angle between said liquid crystals and said spacer is 0° to 60°.

(2) A normally closed liquid crystal display device comprising:
a pair of substrates at least one of which is transparent,
a liquid crystal layer disposed between said pair of substrates,
a group of electrodes for applying to said liquid crystal layer an electric field substantially parallel to the substrate plane and one or more active elements connected to said electrodes, said group of electrodes and active elements being formed on one of said pair of substrates,
an alignment control film formed on said pair of substrates, and
an optical means for changing the optical properties according to the state of molecular alignment of said liquid crystal layer,
wherein the thickness of said liquid crystal layer is controlled to be substantially uniform by the spacer dispersed and held between said pair of substrates, a pretilt angle between said alignment control film and liquid crystals is 3° or less, and a contact angle between said liquid crystals and said spacer is 0° to 60°.

(3) A normally closed liquid crystal display device described in above (1) or (2), which further comprises a contact angle between said liquid crystals and an alignment control direction of said alignment control film and a contact angle between said liquid crystals and a right-angle direction as to the alignment control direction have anisotropy, and the former contact angle is smaller than the latter contact angle.

(4) A normally closed liquid crystal display device comprising:
a pair of substrates al least one of which is transparent,
a liquid crystal layer disposed between said pair of substrates,
a group of electrodes for applying to said liquid crystal layer an electric field substantially parallel to the substrate plane and one or more active elements connected to said electrodes, said group of electrodes and active elements being formed on one of said pair of substrates, an alignment control film formed on said pair of substrates, and an optical means for changing the optical properties according to the state of molecular alignment of said liquid crystal layer, wherein the thickness of said liquid crystal layer is controlled to be substantially uniform by the spacer dispersed and held between said pair of substrates, a pretilt angle between said alignment control film and liquid crystals is 3° or less, and the contact angle between said liquid crystals and said spacer is larger than that between the liquid crystal and the alignment control direction of said alignment control film, and is smaller than the contact angle between said liquid crystals and the right angle direction as to the alignment control direction of said alignment control film.

(5) A normally closed liquid crystal display device described in above (4), wherein the contact angle between said liquid crystals and said spacer is less than 10°.

(6) A normally closed liquid crystal display device described in above (5) wherein the contact angle between the liquid crystals and the alignment direction of said alignment control film is 0° to 5°.

(7) A normally closed liquid crystal display device described in above (5) or (6), wherein the contact angle between said liquid crystals and the right angle direction as to the alignment control direction of said alignment control film is 10° or more.

(8) A normally closed liquid crystal display device described in above (1), (2) or (4), wherein said spacer has a roughened surface.

(9) A normally closed liquid crystal display device described in above (8), wherein the spacer has a surface wherein functional groups showing hydrophilic property and functional groups showing hydrophobic property are introduced, and is roughened by this surface layer.

(10) A normally closed liquid crystal display device described in above (9), wherein the contact angle between a material constituting said spacer and said liquid crystals is less than 90°.

(11) A normally closed liquid crystal display device described in above (1), (2) or (4), wherein the amount of adhesion work between said liquid crystals and said spacer, said amount being represented by a surface tension of said liquid crystals plus a product obtained by multifying a cosine of the contact angle between said liquid crystals and said spacer by said surface tension of said liquid crystals, is 0.05 N/m or more.

(12) A normally closed liquid crystal display device described in above (1), (2) or (4), wherein said spacer has a surface wherein functional groups having a function of a wetting agent for said liquid crystals are introduced.

(13) A normally closed liquid crystal display device described in above (12), wherein the functional groups having a function of a wetting agent are selected from hydrocarbon groups which may have at least one hydroxyl group such as a long-chain alkyl group preferably having 8 to 15 carbon atoms, wherein hydrogen atom(s) may be substituted with at least one hydroxyl group.

(14) A normally closed liquid crystal display device described in above (1), (2) or (4), wherein said liquid crystals contain a compound or functional groups having a function of a wetting agent for a surface of said spacer.

(15) A normally closed liquid crystal display device described in (14), wherein said liquid crystals contain a compound having one or more cyano groups.

(16) A normally closed liquid crystal display device described in above (1), (2) or (4), wherein said liquid crystals has a surface tension of 25 mN/m or less.

(17) A normally closed liquid crystal display device described in above (16), wherein said liquid crystals contain a compound having one or more fluorine atoms as a polar group.

(18) A normally closed liquid crystal display device described in above (1), (2) or (4), wherein said spacer causes light leakage using said spacer as a center to form four-devided shapes.

(19) A normally closed liquid crystal display device described in above (1), (2) or (4), wherein said spacer causes light leakage using said spacer as a center in an amount of $1.0 \times 10^{-4}$%·mm/piece or less, when one spacer is present per $mm^2$.

(20) A normally closed liquid crystal display device described in above (17), wherein said spacer has a surface wherein functional groups having a function as a wetting agent for said liquid crystals are introduced.

(21) A liquid crystal display device comprising:
a pair of substrates at least one of which is transparent;
a liquid crystal layer disposed between said pair of substrates;
a group of electrodes for applying to said liquid crystal layer an electric field substantially parallel to the substrate surface, and a plural number of active elements connected to said electrodes, said group of electrodes and active elements being formed on one of said pair of substrates; and
an alignment control film formed between said liquid crystal layer and at least one of said pair of substrates,
wherein spacers are provided between said pair of substrates, and a film made of a material that can be provided with a liquid crystal aligning ability by irradiation with polarized light is disposed between said liquid crystal layer and said spacers.

(22) A liquid crystal display device described in above (21), wherein said alignment control film comprises a film made of a material which can be provided with a liquid crystal aligning ability by irradiation with polarized light.

(23) A liquid crystal display device described in above (22), wherein the film formed by irradiation with polarized light between said spacers and said liquid crystal layer constitutes a part of said alignment control film.

(24) A liquid crystal display device described in above (22) or (23), wherein a transparent organic polymer layer is provided between said alignment control film and at least one of said pair of substrates, and said spacers are disposed between said transparent organic polymer layer and said alignment control film.

(25) A liquid crystal display device comprising:
a pair of substrates at least one of which is transparent;
a liquid crystal layer disposed between said pair of substrates;
a group of electrodes for applying to said liquid crystal layer an electric field substantially parallel to the substrate plane and a plural number of active elements connected to said electrodes, said group of electrodes and active elements being formed on one of said pair of substrates; and an alignment control film formed between said liquid crystal layer and at least one of said pair of substrates, wherein spacers are provided between said pair of substrates, and a film made of a chemically treated material which can be provided with a liquid crystal aligning ability by irradiation with polarized light is disposed between said liquid crystal layer and said spacers.

(26) A liquid crystal display device comprising:
a pair of substrates at least one of which is transparent;
a liquid crystal layer disposed between said pair of substrates;
a group of electrodes for applying to said liquid crystal layer an electric field substantially parallel to the substrate plane and a plural number of active elements connected to said electrodes, said group of electrodes and active elements being formed on one of said pair of substrates; and
an alignment control film formed between said liquid crystal layer and at least one of said pair of substrates,
wherein spacer surface is coated with a material which can be provided with a liquid crystal aligning ability by irradiation with polarized light.

(27) A liquid crystal display device described in any one of above (21) to (26), wherein the material which can be provided with a liquid crystal aligning ability by irradiation with polarized light is a material having photo-isomerization reactivity.

(28) A liquid crystal display device described in above (27), wherein the structural segment contributing to the photo-isomerization reaction by polarized light irradiation of the material which can be provided with a liquid crystal aligning ability by irradiation with polarized light is identical with the structural segment contributing to the photo-isomerization reaction by polarized light irradiation of said alignment control film.

(29) A liquid crystal display device described in above (27), wherein the wavelength region where the photo-isomerization reaction of said material capable of being provided with a liquid crystal aligning ability by irradiation with polarized light and disposed between said liquid crystal layer and said spacers is induced substantially coincides with the wavelength region where the photo-isomerization reaction by polarized light irradiation of said alignment control film is induced.

(30) A liquid crystal display device described in above (27), wherein said alignment control film is made of a material which does not absorb light in the wavelength region where the photo-isomerization reaction of the material capable of being provided with a liquid crystal aligning ability by irradiation with polarized light is induced.

The present inventors have studied earnestly and found that by making the contact angle between the spacer and the liquid crystals 60° or less, the liquid crystal molecules on the spacer surface aligned substantially uniform, and the spacer having a four-divided shape can appear predominantly.

FIG. 1 is a cross-sectional view of one layer in the liquid crystal display device. Since the parallel alignment direction of the spacer beads surface and the alignment direction of the alignment control film make an angle of substantially 90° in the region 48 in FIG. 1, the liquid crystal molecules are subjected to the liquid crystal molecules are subjected to the greatest stress. Thus, in order to make the region 48 stabler, it is preferable to impart wettability against the sight angle direction to the alignment control direction of the alignment control film, that is to impart anisotropy to the contact angle, and to make the contact angle against the alignment control direction small.

Particularly, even in a liquid crystal display device wherein a wide viewing angle is provided by making the pretilt angle very low, it is possible to make the 4-divided type very stable by making the contact angle between the liquid crystals and the spacer larger than the contact angle between the alignment control direction of alignment control film and the liquid crystals, and smaller than the contact angle between the liquid crystals and the right-angle direction as to the alignment control direction.

Further, when the contact angle between the liquid crystals and the spacer beads is 90° or less, it is possible to make the contact angle smaller by roughening the spacer beads surfaces.

The roughening of the spacer beads surfaces is important, and even very fine roughened surfaces produced by introducing surface layers can provide expected effects.

In order to make the contact angle between the spacer and the liquid crystals 60° or less, one method is to introduce a functional group which becomes a wetting agent for the liquid crystals into the spacer surface. The introduction of such a functional group can be carried out by using a silane coupling agent, or by chemical modification using a surface modifying agent having an acryl group, while applying vinyl groups or hydroxyl groups of the spacer beads by themselves.

For example, a long-chain alkyl group having one or more multi-valent hydroxyl groups, an alkyl group having a terminal amino group, etc. can be introduced into the spacer beads surfaces via a silane coupling agent, etc. Alternatively, a long-chain alkyl group having one or more multi-valent hydroxyl groups and one or more acryl groups or vinyl groups at another end, an alkyl group having a terminal amino group, etc. can be introduced by chemical modification. When a silane coupling agent is used, the spacer beads can be an inorganic material such as silica.

On the other hand, it is possible to introduce a functional group into the liquid crystals, said functional group being able to make wetting properties with the spacer surface better. For example, a fluorine group remakably reduces its critical surface tension. To obtain a solid surface tension directly is not established yet. But, when the spacer is made from a polymeric compound which has a surface tension of about 30 mN/m or more, the contact angle can be effectively lowered by making the surface tension of liquid crystals 25 mN/m or less.

The anisopropy of the contact angle between the alignment control film and the liquid crystals can be imparted by increasing the rubbing strength, taking a rigid molecular structure in the alignment control direction, taking a molecular structure which strengthens intermolecular attaction with the liquid crystals, etc.

As another embodiment for eliminating light leakage associated with the spacer beads, there is offered a liquid crystal display device of a structure comprising a pair of substrates at least one of which is transparent, a liquid crystal layer disposed between said pair of substrates, a group of electrodes for applying to said liquid crystal layer an electric field substantially parallel to the substrate plane and a plural number of active elements connected to said electrodes, said group of electrodes and active elements being formed on one of said pair of substrates, and an alignment control film formed between said liquid crystal layer and at least one of said pair of substrates, wherein spacer beads are provided between said pair of substrates, and a film is disposed between said spacer beads and the liquid crystal layer, said film having been made of a material that can be provided with a liquid crystal aligning ability by irradiation with polarized light.

Thus, when the spacer bead surface is provided with an alignment controlling function by irradiation with poralized light, there takes place no division of alignment such as described above, with consequent elimination of light leakage attributable to the spacer beads themselves. Also, as a result of affording a liquid crystal aligning ability to the spacer bead surface by polarized light irradiation, it becomes possible to control alignment of the liquid crystal molecules in the same direction as the alignment film, regardless of the shape of the spacer beads, with no concern on whether the liquid crystal molecules are aligned horizontally or vertically.

Further, when a film formed by exposing to polarized light a material capable of being provided with a liquid crystal aligning ability by poralized light irradiation is used as said alignment control film, there is eliminated any need of conducting a rubbing treatment, and it is possible to provide an alignment controlling function with a substantially same degree of alignment regulating force as possessed by the alignment control film.

Furthermore, when the film formed by polarized light irradiation between the spacer and the liquid crystal layer is adapted to constitute a part of the alignment control film, it becomes possible to afford the same alignment regulating force to the alignment control film and to unnecessitate polarized light irradiation for the spacer bead surface.

Still further, when a transparent organic polymer layer is formed between said alignment control film and at least one of a pair of substrates, and a spacer is disposed between this transparent organic polymer layer and the alignment control film, adhesion between the alignment control film and the substrate is strengthened and also the substrate surface is more flattened, resulting in remarkable improvement of the image quality.

According to still another embodiment of the present invention, a liquid crystal display device is provided which comprises a pair of substrates at least one of which is transparent, a liquid crystal layer disposed between said pair of substrates, a group of electrodes for applying to said liquid crystal layer an electric field substantially parallel to the substrate plane and a plural number of active elements connected to said electrodes, said group of electrodes and active elements being formed on one of said pair of substrates, and an alignment control film formed between said liquid crystal layer and at least one of said pair of substrates, wherein a spacer is provided between said pair of substrates, and a film obtained by chemically treating a material that can be provided with a liquid crystal aligning ability by polarized light irradiation is disposed between said spacer and liquid crystal layer.

It is also preferable to coat the spacer surface with a material that can be provided with a liquid crystal aligning ability by polarized light irradiation.

The material that can be provided with a liquid crystal aligning ability by polarized light irradiation and is used for the said purpose in this invention is preferably the one having photo-isomerization reactivity.

When the structural section contributing to photo-isomerization reaction by polarized light irradiation of the specified material is equalized to the structural section contributing to similar photo-isomerization reaction of the alignment control film, the alignment treatments can be accomplished simultaneously using the same light.

Also, when the long wavelength region which causes the photo-isomerization reaction of the specified material formed between the spacer and the liquid crystal layer is arranged to substantially coincide with the long wavelength region which induces the photo-isomerization reaction of the alignment control film by polarized light irradiation, it becomes possible to perform the alignment treatments in the same direction simultaneously using the same light.

Conversely, when the alignment control film is made of a material which is incapable of inducing photo-isomerization reaction with light in the long wavelength region causing photo-isomerization reaction of the specified material or which is incapable of absorbing light in said long wavelength region, it becomes possible to freely conduct the alignment treatment of the spacer bead surface.

In the present invention, as explained above, since a liquid crystal aligning ability is afforded to the spacer bead surface by polarized light irradiation, control of alignment of the liquid crystal molecules in the same direction as the alignment film, not alignment in either horizontal or vertical direction, is enabled regardless of the shape of the spacer beads.

Further, according to the present invention, it becomes possible to lessen light leakage due to disturbance of initial alignment of the liquid crystal layer around the spacer bead surface and to provide a high-contrast liquid crystal display device.

As described above, in an in-plane switching mode liquid crystal display device, the light leakage amount can be reduced by making the light leakage taking a 4-divided shapes by placing the spacer beads in the center.

The present invention is further illustrated by the following embodiments.

EXAMPLE 1

Figure 3:
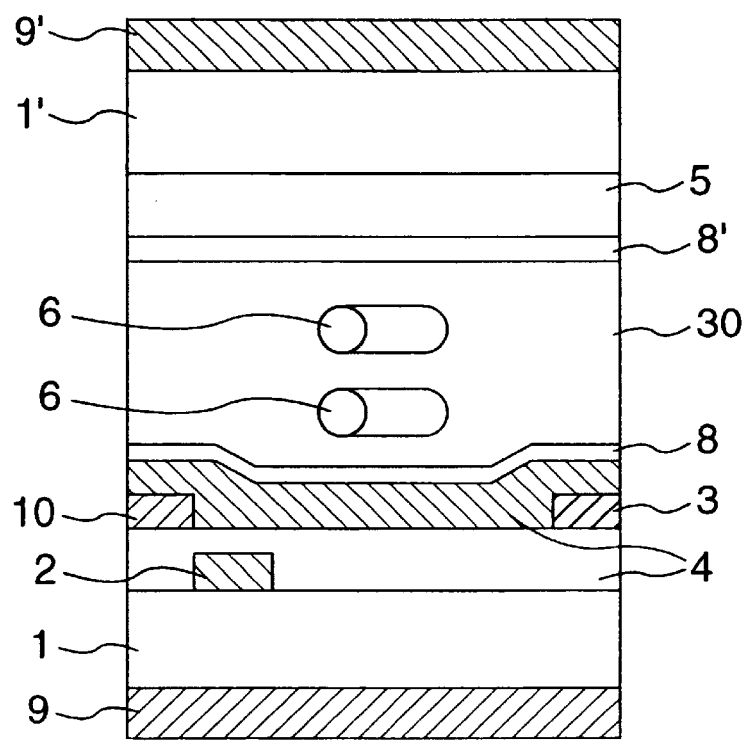
FIG. 3 is a schematic sectional view of a panel in a liquid crystal display device according to the present invention.

Referring to FIG. 3, there is shown a schematic sectional view of a panel in a liquid crystal display device according to the present invention. It will be seen that a liquid crystal layer 30 comprising a composition of plural compounds is disposed between a pair of transparent substrates 1,1'. In FIG. 3, the liquid crystal molecules are schematically shown as rod-like bodies 6. Polarizers 9, 9' are disposed on the outside of said pair of substrates 1, 1'. Strip electrodes 2, 3 are provided on the surface of one of the substrates 1 on the inside of the cell, and an alignment control film 8 is overlaid thereon. Electrode 2 is a common electrode which supplies an electric voltage of a fixed waveform independently of the picture signal, and electrode 3 is a pixel electrode providing a voltage whose wavelength varies according to the picture signal. An image signal electrode 10 is provided at the same altitude as the pixel electrode 3. There are provided two insulating layers 4 each of which is made of silicon nitride. On the opposite substrate 1' is provided a color filter 5 for making color display.

Figure 4:
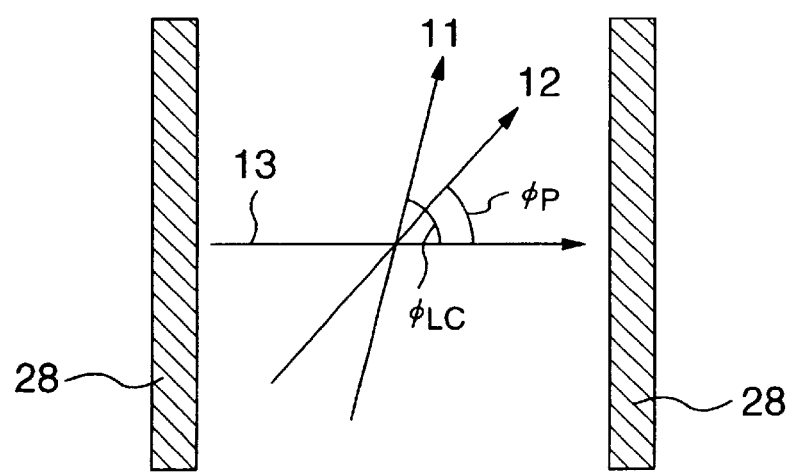
FIG. 4 illustrates the angles made by the long-axial alignment direction of the liquid crystal molecules and the polarized light transmission axis of the polarizer with the direction of electric field.

A 3% solution of polyamic acid, which is precursor of the alignment control film 8, is applied to the substrate and calcined at 200° C. for 30 minutes for imidization. Specifically, polyamic acid is prepared using 1,2,3,4-cyclopentenetetracarboxylic acid dianhydride, 1,2,4,5-cyclohexanetetracarboxylic acid dianhydride, 3,3',4,4'-biscyclohexanetetracarboxylic acid dianhydride, 3,3',4,4'- benzophenonetetracarboxylic acid dianhydride or the like as acid anhydride and 4,4'-diaminodiphenyl sulfide, 3,3'-diaminodiphenyl sulfide, 1,4-diaminocyclohexane, 3,3'-diaminodiphenyl sulfone or the like as diamine, and its solution is applied to the substrate, dried and calcined to form an alignment control film 8, followed by rubbing thereof for aligning the liquid crystal molecules. The long axis direction of the liquid crystal molecules in the produced state of alignment, i.e. the initial alignment direction 11, is adjusted so that the angle ΦLC defined in FIG. 4 becomes 75°. The acid anhydrides and diamine compounds such as mentioned above can be used either singly or by mixing two or more of them as desired.

Figure 9:
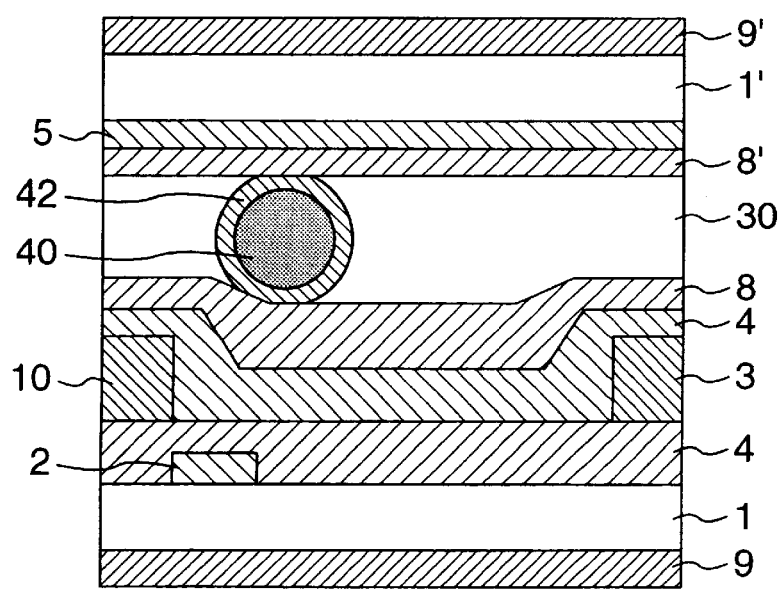
FIG. 9 is a schematic sectional illustration of a liquid crystal display device according to an embodiment of the present invention.

Then the polymeric spacer beads 40 having a particle size of 4 μm are dispersed on the substrates by dry scatter method. "Dry scatter method" is a method in which a negative pressure is generated at the nozzle section by discharging an inert gas from a compressed gas supply pipe to suck up and scatter the spacer beads from a spacer beads supply pipe. No solvent is used as a dispersing medium for the spacer beads. The spacer beads are made of divinylbenzene and have a $C_5$ alkyl group and a hydroxyl group introduced to the surfaces with the aid of a silane coupling agent. Each bead is coated with an alignment control film 42 which functions to have the liquid crystal molecules aligned in the parallel direction. Then the upper and lower substrates are placed in position and the peripheral parts are sealed to constitute an empty cell-like structure. A schematic sectional illustration of this liquid crystal display device is shown in FIG. 9. The reference numerals used in FIG. 9 correspond to those in FIG. 3.

Figure 5A:
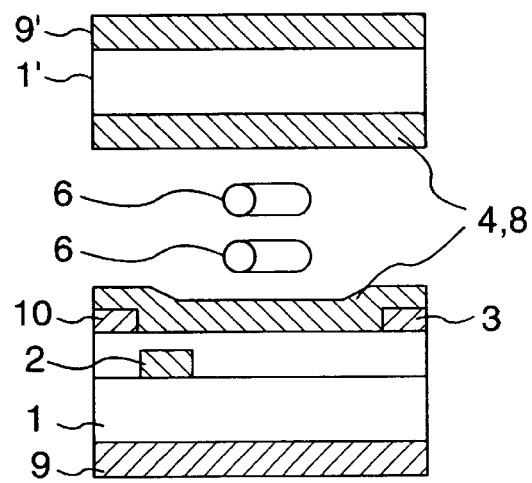
FIGS. 5A to 5D illustrate the behavior of the liquid crystal molecules in an IPS mode liquid crystal display device.
Figure 5B:
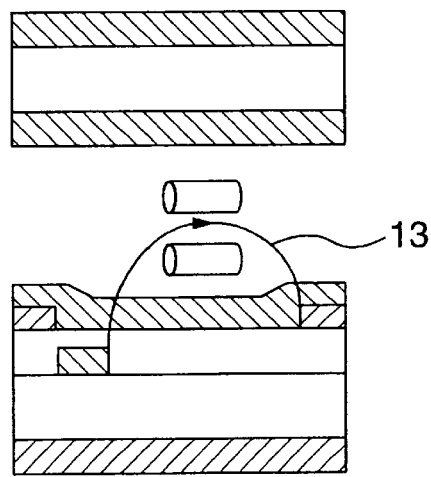
Figure 5C:
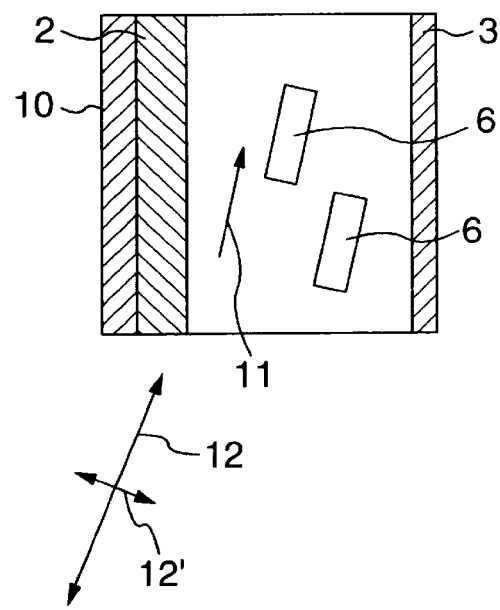
Figure 5D:
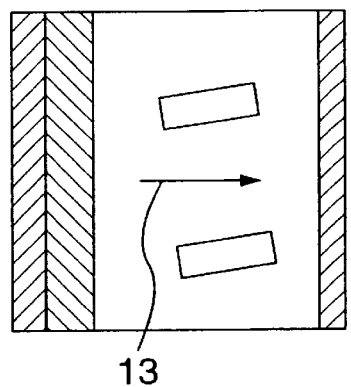

Nematic liquid crystal with positive dielectric anisotropy is used as the liquid crystal composition. Dielectric anisotropy Δε of the liquid crystal is 10.2 and its refractive anisotropy Δn is 0.073. FIGS. 5A to 5D illustrate the switching behavior of the liquid crystal molecules in the liquid crystal panel obtained in the manner described above. In this Example, the liquid crystal molecules 6 are aligned to have the angle ΦLC of 75° against the direction vertical to the longitudinal direction of the strip electrodes when no electric field is applied. In case dielectric anisotropy of the liquid crystal is positive, alignment would be made to satisfy the condition of $45° \leq |\Phi LC| < 90°$. In the case of the liquid crystal composition illustrated in FIGS. 5A to 5D, dielectric anisotropy of the liquid crystal may be negative. In this case, it is recommended to initially align the liquid crystal molecules to the angle of $0° \leq |\Phi LC| < 45°$ from the direction vertical to the strip electrodes. In FIGS. 5A to 5D, the direction of alignment is indicated by an arrow 11. When an electric field 13 is applied across the electrodes 2, 3, alignment of the liquid crystal molecules 6 is shifted so that their long axis direction will become parallel to the direction of electric field 13 as shown in FIGS. 5B and 5D. As a result of this operation, θ in the formula (1) varies in accordance with electric field strength E, causing a corresponding variation of transmittance.

In the instant embodiment of the present invention, the liquid crystal is sandwiched between a pair of polarizers arranged normal to each other since a birefrigent mode display system is employed. Further, in order to provide the characteristics of the normally closed system which gives dark display at low voltage, the arrangement of FIG. 4, ΦP=ΦLC=75°, was made, i.e. the polarized light transmission axis 12 of one of the polarizers is paralleled to the direction of initial alignment while the polaraized light transmission axis 12' of the other polarizer is set perpendicular to the initial alignment. The observed transmitted light strength is determined by the formula (1).

Figure 7:
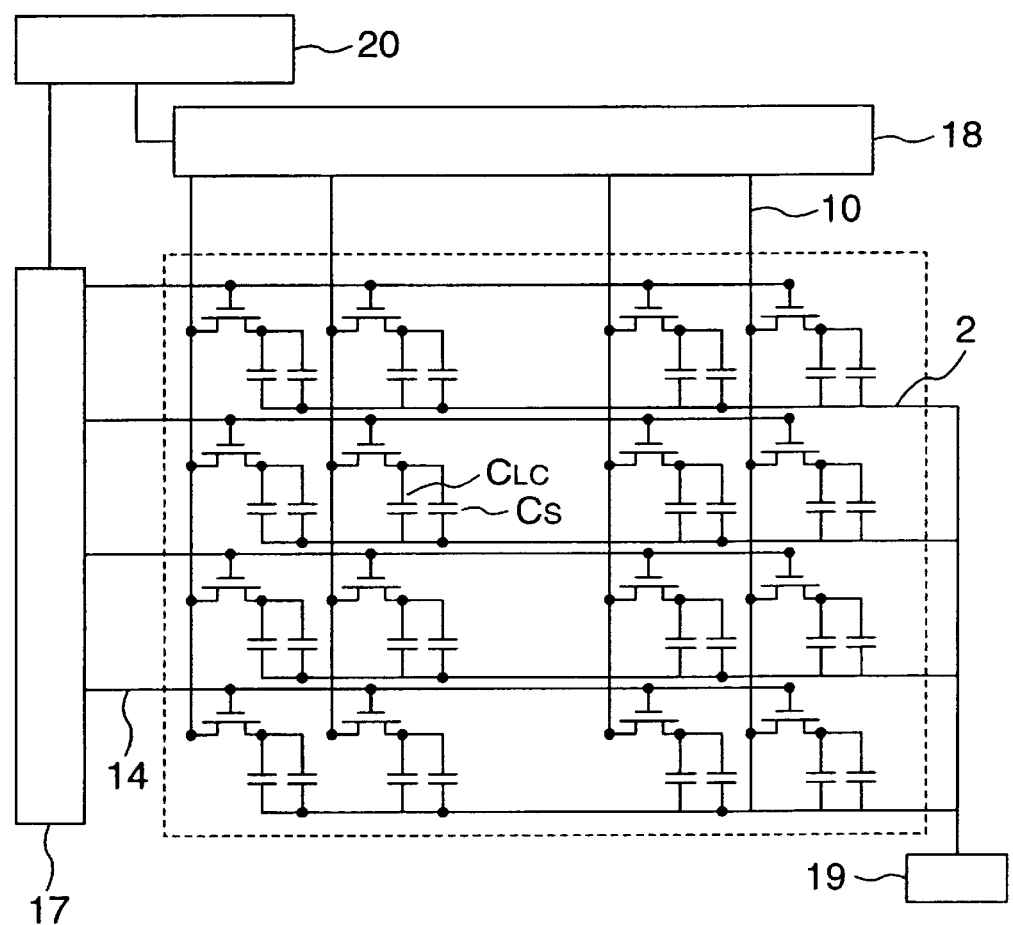
FIG. 7 illustrates the circuit system in a liquid crystal display device according to the present invention.

FIGS. 6A to 6C illustrate the layout of a group of electrodes comprising common electrode 2, pixel electrode 3, picture signal electrode 10 and scanning electrode 14, amorphous silicon 16, thin-film transistor 15, insulating film 4 and alignment control film 8 in a unitary pixel section in the instant embodiment of the present invention. FIG. 6A is a frontal view taken from the direction vertical to the panel surface, and FIGS. 6B and 6C are lateral sectional views. FIG. 7 illustrates the circuit system in the liquid crystal display device in the instant embodiment of the present invention. The circuit system comprises vertical scanning signal circuit 17, picture signal circuit 18, common electrode driving circuit 19, power circuit and controller 20, but the circuit arrangement available in the present invention is not limited to the shown system.

Figure 8:
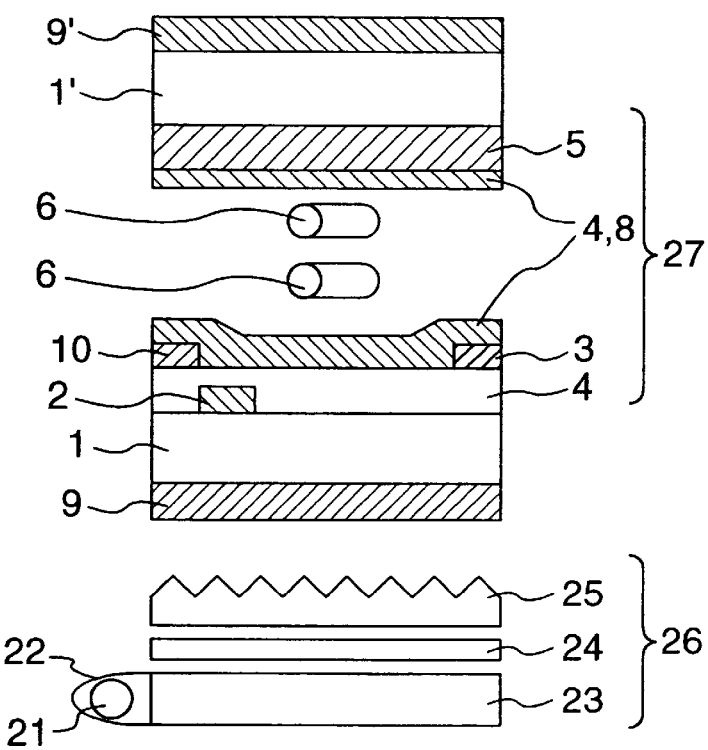
FIG. 8 illustrates the optical system in a liquid crystal display device according to the present invention.

One example of constitution of the optical system in the liquid crystal display device formed as mentioned above is shown in FIG. 8. It will be seen that a back light unit 26 comprising a power source 21, a light cover 22, a photoconductor 23 and a diffuser 24 is provided on the backside of a liquid crystal panel 27. A prism sheet 25 for increasing luminance at the normal angle is shown in the drawing, but there is no problem when no prism sheet is used. A fragmentary perspective view of such a liquid crystal display device, for example, is shown in FIG. 10.

In this case, the surface tension of the liquid crystal material is 28 mN/m, and the contact angle between the liquid crystal and the spacer beads is 48.6°. Since the contact angle between the liquid crystal and the alignment direction of the alignment film is 10°, a 4-division type shown in FIG. 1 can be obtained, wherein light leakage due to the spacer beads is shown almost over the whole bead surface. The volume of light leakage per piece of spacer bead is $8.2 \times 10^{-5} \% \cdot mm^2$/piece.

Figure 10:
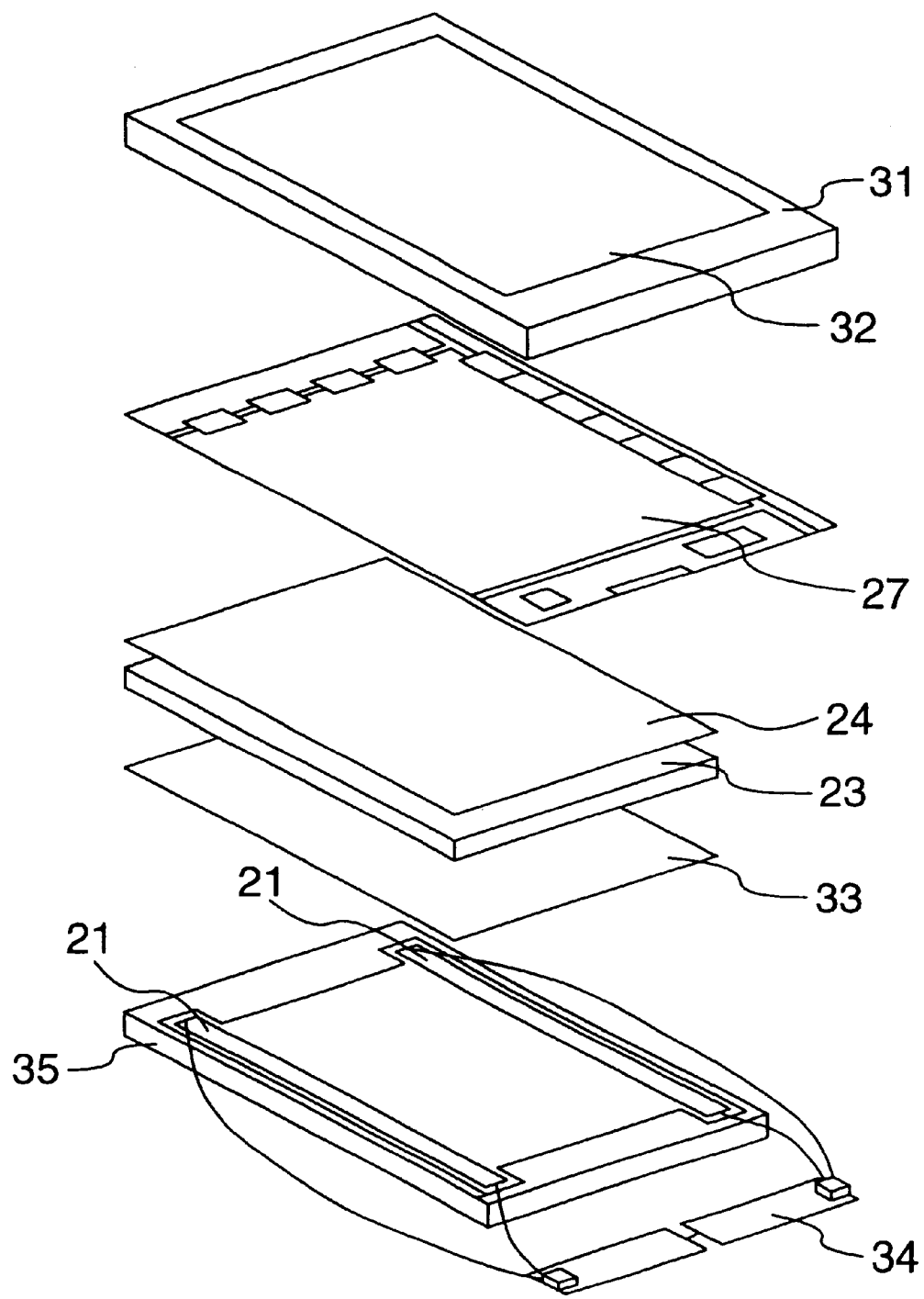
FIG. 10 is a fragmentary perspective view of a liquid crystal display device of the present invention.

In FIG. 10, numeral 23 denotes a photoconductor, numeral 24 denotes a diffuser, numeral 21 denotes a light source, numeral 27 denotes a liquid crystal panel, numeral 31 denotes a shield case, numeral 32 denotes an aperture, numeral 33 denotes a reflector, numeral 34 denotes an invertor circuit, and numeral 35 denotes a lower case.

The light leakage can be measured as follows. First a luminance of dark display in a region containing no spacer heads in a liquid crystal panel is measured. Then, a luminance in a region containing spacer beads and having the same area as the region previously measured is measured. Next, the difference between both luminances measured is divided by the density of spacer beads and the resulting value is defined as a light leakage per spacer bead. By measuring as mentioned above, the light leakage can be measured quantitatively.

A transmittance used herein can be defined as a transmittance in a display picture element (pixel) region. That is, a transmittance (luminance) in a practical liquid crystal display is results of aperture ratio of a color filer and a display region, and influences of light leakage caused by factors other than the spacer beads, for example, edge portions of picture element, etc. Therefore, these influences are removed and the transmittance is shown in a state wherein only the influence of spacer is quantitatively evaluated.

Figure 11:
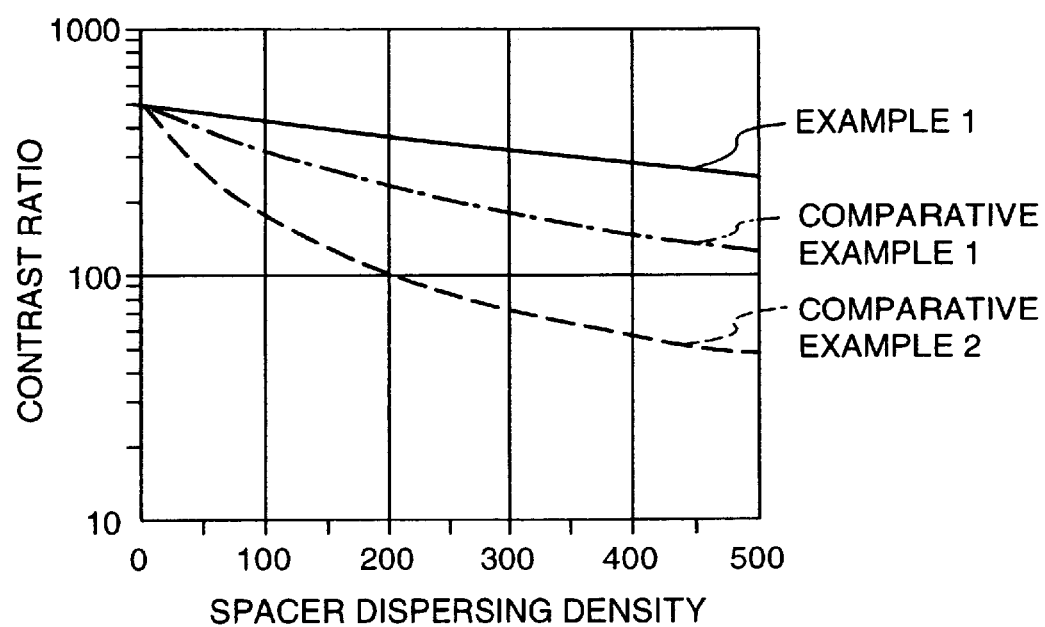
FIG. 11 is a graph explaining properties of a liquid crystal display device of the present invention.

FIG. 11 shows a relationship between a spacer dispersing density and a light leakage of the spacer of this Example, and influences of spacers of Comparative Examples mentioned below on lowering in contrast ratio. As shown in FIG. 11, the lowering of the contrast ratio can be inhibited remarkably. The maximum value of the spacer dispersing density is 500 pieces/mm². The dispersing density necessary for maintaining the thickness of liquid crystal layer at constant depends on the margin of production process of a liquid crystal display device but is not preferable practically above 500 pieces/mm$^2$ due to bad influences on the picture quality.

From FIG. 11, it is possible to estimate an allowable value against the light leakage of spacer. That is, when the light leakage is above $1.0 \times 10^{-4}$ (%·mm$^2$/piece), the contrast ratio is reduced to a half by only the influence of a spacer. Since there are many factors for lowering the contrast ratio other than the spacer, it is not preferable to further lower the contrast ratio only by the influence of light leakage of spacer. Therefore, in order to realize an in-plane switching mode liquid crystal display device having a good picture quality, which is an object of the present invention, it is necessary to make the light leakage of spacer $1.0 \times 10^{-4}$ (%·mm$^2$/piece) or lower.

When the above layout is applied to a prototype model of IPS mode TFT liquid crystal display device having a diagonal of 13.3 inches, a pixel count of 1,024×RGB×768 and a spacer bead dispersion density of about 120 pieces/mm$^2$, the black display with very good level is shown. This device has a high contrast ratio of 300.

Contrast ratio can be determined by measuring transmittance (luminance) of bright display, or luminance and transmittance (luminance) of dark display, and dividing the measured value of the former by the measured value of the latter. Transmittance can be determined by a photomultiplier with brightness of the light source being supposed to be 100. Luminance can be determined by measuring brightness of the display device by a luminance meter.

EXAMPLE 2

10 g of polymeric spacer beads having a particle size of 4.0 μm and composed of divinylbenzene-styrene copolymer resin is immersed in a mixed solution of 70 g of 20% hydrochloric acid and 30 g of isopropyl alcohol, to which a solution of 3 g of 7-hydroxyoctylcarboxyaldehyde in 10 g of isopropyl alcohol is added dropwise with stirring. After 2-hour reaction at 50° C., the reaction solution is filtered and the thus treated spacer beads are immersed in a solution of 70 g of pure water and 30 g of isopropyl alcohol and filtered. After repeating the above operation 10 times, the the beads are immersed in 70 g of toluene and filtered, this operation being repeated 5 times, followed by drying.

For forming an alignment film, polyamic acid is prepared by using 1:4 mixture (by molar ratio) of 4-octadecyloxy-1,3-diaminocyclohexane and p-phenylenediamine as diamine segment and an equimolar mixture of 1,2,3,4-butanetetracarboxylic acid dianhydride and 1,2,3,4-cyclobutanetetracarboxylic acid dianhydride as acid anhydrides, and this solution is applied to the substrate, dried and calcined to form an alignment control film 8 and rubbed for aligning the liquid crystal molecules. These acid anhydrides and diamine compounds need not be used singly; they may be used by mixing two or more of them as desired.

When the thus treated spacer beads are applied to a prototype of IPS mode TFT liquid crystal display device having a diagonal of 13.3 inches, a pixel count of 1,024× RGB×768 and an average spacer bead dispersion density of 100 pieces/mm$^2$ for the manufacture in the same way as in Example 1, there can be obtained spacer beads with light leakage of the 4-division type shown in FIG. 1 and the volume of light leakage of $7.8 \times 10^{-5}$ (%·mm$^2$/piece of spacer bead) almost over the whole surface. The contact angle between the liquid crystal and the spacer beads in this Example is 38.2° and that between the liquid crystal and the alignment direction of alignment film is 8°. The obtained liquid crystal display device shows fine-level black display and a contrast ratio of 320.

Comparative Example 1

A polyamic acid solution of PIQ-1800 (an amorphous film produced by Hitachi Chemical Co., Ltd.), diluted to 4% concentration, is applied to the substrate, calcined and imidized at 200° C. for 30 minutes to form an alignment control film 8, and rubbed. Then the silica spacer beads, 4 μm in particle size and having a strong action to urge horizontal alignment of liquid crystal, are dispersed on the substrate by the dry scatter method.

A prototype of liquid crystal display device is manufactured in the same way as in Example 1. The spacer beads inducing the 2-division type alignment of liquid crystal shown in FIG. 2 and offering a light leakage contribution of $28 \times 10^{-5}$ (%·mm$^2$/piece) develope in an existence ratio of approximately 60%. In this Comparative Example, the contact angle between the liquid crystal and the spacer is 7.8°, and that between the liquid crystal and the alignment direction of alignment film is 8.9° and the contrast ratio of the display device is 200.

Comparative Example 2

A polyamic acid solution of PIQ-1800, diluted to 4% concentration, is applied to the substrate, calcined and imidized at 200° C. for 30 minutes to form an alignment control film 8, and rubbed.

The polymeric spacer beads having a particle size of 4 μm and modified so as to be covered with a $C_{18}$ long-chain alkyl group on the surface for expediting vertical alignment of liquid crystal are dispersed on the substrate by a dry scatter method. Then the upper and lower substrates are placed in position and the peripheral parts are sealed to make an empty cell-like structure. With this construction, a prototype of liquid crystal display device is manufactured in the same way as in Example 1.

In this case, 4-division type light leakage placing the spacer in the center is about 70% and the 2-division type light leakage is about 30%. The amount of light leakage in the 4-division type region in this Comparative Example is $42 \times 10^{-5}$ (%·mm$^2$/piece), and that in the 2-division type region is $94 \times 10^{-5}$ (%·mm$^2$/piece). The contact angle between the liquid crystal and the spacer beads is 83°, which shows almost vertical alignment. In the case of vertically aligned spacer beads, both the 4-divided type and the 2-divided type (shown in FIGS. 1 and 2) show disturbance in alignment in the azimuthal direction against the aligning direction of the alignment control film and increase the light leakage rate remarkably. Consequently, float of the black level was prominent, and the contrast ratio is as low as 150.

EXAMPLE 3

100 g of the polymeric spacer beads having a particle size of 3.8 μm and otherwise the same as used in Example 2, are immersed in 100 g of a THF solution containing equimolar amounts of 3-aminopropyl-diethoxymethylsilane, 7-hydroxyoctylcarbonyl chloride and triethylamine, and the solution is stirred at 50° C. for 2 hours, then filtered, washed with THF and dried.

For forming an alignment film, polyamic acid is prepared using p-phenylenediamine as a diamine moiety and pyromellitic acid dianhydride as an acid anhydride moiety, and this solution is coated on the substrate, dried and calcined to form an alignment control film 8, and rubbed for aligning the liquid crystal molecules so as to make the pretilt angle 3.3°.

A prototype of IPS mode TFT liquid crystal display device having a diagonal of 13.3 inches, a pixel count of 1,024×RGB×768 and an average spacer bead dispersion density of 120 pieces/mm$^2$ is manufactured in the same way as in Example 1. The contact angle between the liquid crystal and the spacer beads is 41° and that between the liquid crystal and the alignment direction of alignment film is 6.7°. The spacer beads of the 4-division type shown in FIG. 1 with a light leakage contribution of 7.8×10$^{-5}$ (%·mm$^2$/piece) appear almost over the whole surface. This liquid crystal display device shows very fine black level and a contrast ratio of 295.

EXAMPLE 4

10 g of the polymeric spacer beads having a particle size of 3.8 μm and otherwise the same as used in Example 2, are immersed in 100 g of THF solution containing equimolar amounts of 3-aminopropydiethoxy-methylsilane, trifluoromethoxyoctylcarbonyl chloride and triethylamine, and the solution is stirred at 50° for 2 hours, filtered, washed with THF and dried.

For forming an alignment film, polyamic acid is prepared using 4,4'-diaminodiphenylmethane as a diamine moiety and 1,2,3,4-cyclopentanetetracarboxylic acid dianhydride as an acid anhydride moiety, and this solution is coated on the substrate, then dried and calcined to form an alignment control film 8, and rubbed for aligning the liquid crystals.

A prototype of IPS mode TFT liquid crystal display device having a diagonal of 13.3 inches, a pixel count of 1,024×RGB×768 and an average spacer bead dispersion density of 90 pieces/mm$^2$ is manufactured in the same way as in Example 1. The contact angle between the liquid crystal and the spacer beads is 28.9° and that between the liquid crystal and the alignment direction of alignment film is 9.8°. The spacer beads of the 4-division type shown in FIG. 1 with a light leakage contribution of 7.1×10$^{-5}$ (%·mm$^2$/piece) appear almost over the whole bead surface. A liquid crystal display device showing very fine black level and a contrast ratio of 310 is obtained.

EXAMPLE 5

Equimolar amounts of diethoxy-3-glycidoxypropylmethylsilane and dihydroxyoctylamine are mixed, stirred and evaporated, and the produced compound is dissolved in ethanol. The polymeric spacer beads as used in Example 2 are immersed in this solution, stirred at 50° C. for 2 hours, filtered, washed with ethanol and dried.

For forming an alignment film, polyamic acid is prepared using a 1:4 mixture (by molar ratio) of 4-octadecyloxy-1,3-diaminocyclohexane and p-phenyldiamine as a diamine moiety and an equimolar mixture of 1,2,3,4-butanetetracarboxylic acid dianhydride and 1,2,3,4-cyclobutanetetracarboxylic acid dianhydride as acid anhydrides, and its solution is coated on the substrate, dried and calcined to form an alignment control film 8, and rubbed for aligning the liquid crystal molecules so as to make the pretilt angle 2.8°. The acid anhydrides and diamine compounds such as mentioned above need not be used singly; they may be used by mixing two or more of them as desired.

A prototype model of IPS mode TFT liquid crystal display device having a diagonal of 13.3 inches, a pixel count of 1,024×RGB×768 and an average spacer bead dispersion density of 100 pieces/mm$^2$ is manufactured in the same way as in Example 1. The contact angle between the liquid crystal and the spacer beads is 18° and that between the liquid crystal and the alignment direction of the alignment film is 9.3°. The spacer beads of the 4-division type shown in FIG. 1 with a light leakage contribution of 8.0×10$^{-5}$ (%·mm$^2$/piece) appeare almost over the whole bead surface. The obtained liquid crystal display device shows very fine black level and a contrast ratio of 310.

EXAMPLE 6

10 g of the polymeric spacer beads having a particle size of 3.8 μm and otherwise the same as used in Example 2, are immersed in 100 g of a THF solution containing equimolar amounts of 3-aminopropyl-diethoxymethylsilane, 4-hydroxypentylbenzoyl chloride and triethylamine, stirred at 50° C. for 2 hours, filtered, washed with THF and dried.

For forming an alignment film, polyamic acid is prepared using 1:4 mixture (by molar ratio) of 4-octadecyloxy-1,3-diaminocyclohexane and p-phenylenediamine as a diamine moiety and an equimolar mixture of 1,2,3,4-butanetetracarboxylic acid dianhydride and 1,2,3,4-cyclobutanetetracarboxylic acid dianhydride as acid anhydrides, and its solution is coated on the substrate, dried and calcined to form an alignment control film 8, and rubbed for aligning the liquid crystal molecules. The acid anhydrides and diamine compounds such as mentioned above need not be used singly; they may be used by mixing two or more of them as desired.

A prototype model of IPS mode TFT liquid crystal display device having a diagonal of 13.3 inches, a pixel count of 1,024×RGB×768 and an average spacer bead dispersion density of 80 pieces/mm$^2$ is manufactured in the same way as in Example 1. The contact angle between the liquid crystal and the spacer beads is 32°, and that between the liquid crystal and the alignment directin of alignment film is 10°. The spacer beads of the 4-division type shown in FIG. 1 with a light leakage rate of 7.1×10$^{-5}$ (%·mm$^2$/piece) appear almost over the whole surface. It is possible to obtain a liquid crystal display device showing very fine dark level and a contrast ratio of 290.

EXAMPLE 7

Equimolar amounts of diethoxy-3-glycidoxypropylmethylsilane and dihydroxypentylamine are mixed, stirred and evaporated, and the resulting compound is dissolved in ethanol. The polymeric spacer beads having a particle size of 4.0 μm are immersed in this solution, stirred at 50° C. for 2 hours, filtered, washed with ethanol and dried.

As the monomer component of the alignment film, a 1:4 mixture (in molar ratio) of 4-octadecyloxy-1,3-diaminocyclohexane and p-phenylenediamine is used as diamine moiety and an equimolar mixture of 1,2,3,4-butanetetracarboxylic acid dianhydride and 1,2,3,4-cyclobutanetetracarboxylic acid dianhydride is used as acid anhydride to prepare polyamic acid. This solution is coated on the substrates, dried and calcined to form an alignment control film 8, and the film is rubbed for aligning the liquid crystal molecules. The rubbing density is adjusted to provide a pretilt angle of 1°. These acid anhydrides and diamine compounds may not be used singly; they may be used by mixing two or more of them as required.

An IPS mode TFT liquid crystal display device with a diagonal of 13.3 inches, a pixel count of 1,024×RGB×768 and an average spacer bead dispersion density of 100 pieces/mm$^2$ is made in the same way as in Example 1. In the device of this embodiment, the liquid crystal/spacer bead contact angle is 8°, the contact angle between the liquid crystal and the alignment film in its aligning direction is 6° and the contact angle in the direction orthogonal to the aligning direction is 9.8°. In the liquid display of this construction, the spacer beads of the 4-division type shown in FIG. 1 with a light leakage contribution of $7.9 \times 10^{-5}$ (%·mm$^2$/piece) appeare almost over the whole surface. Thereby a liquid crystal display device showing a very good dark level with a contrast ratio of 310 can be obtained.

The liquid display device of the instant embodiment has a particularly wide viewing angle because of very small pretilt angle. In case the pretilt angle is small as in the instant embodiment, the liquid crystal molecules in the region 48 shown in FIG. 1 must be aligned vertically to the spacer fairly strictly. This is for the reason that if the liquid crystal molecules are aligned horizontally to the azimuthal direction, no 4-division type alignment is provided nor can be effected molecular alignment horizontal to the polar direction. In this case, if the contact angle with the alignment control film in its alignment controlling direction is smaller than the liquid crystal/spacer contact angle, it is possible to afford an easy-to-wet property to the molecules in the alignment controlling direction, and if the contact angle in the direction orthogonal to the alignment controlling direction is smaller than the liquid crystal/spacer contact angle, the liquid crystal molecules become hard to wet in this direction, i.e. they become easy to control in the alignment controlling direction. This has the effect of realizing preferential emergence of the 4-division type even in case the pretilt angle is low and the liquid crystal/spacer contact angle is small. Particularly when the liquid crystal/spacer contact angle is smaller than 10°, the horizontal aligning tendency becomes very strong, so that it is desirable to make use of the above effect of the instant embodiment.

EXAMPLE 8

10 g of polymeric spacer beads having a particle size of 4.0 μm are immersed in 100 g of a THF solution containing equimolar amounts of 3-aminopropyldiethoxymethylsilane, 7-hydroxyoctylcarbonyl chloride and triethylamine, and the solution is stirred at 50° C. for 2 hours, then filtered, washed with THF and dried. Then glass fibers of 4 μm in diameter are mixed in a ratio of 20%, and the mixture is dispersed in a 1:1 mixed solvent of 2-propanol and water by an ultrasonic cleaner for 10 minutes and then centrifuged to separate the spacer beads. This treatment produce a small cavity on the spacer surface.

As the monomer component of the alignment film, p-phenylenediamine is used as diamine moiety and pyromellitic acid dianhydride is used as acid anhydride moiety to prepare polyamic acid, and this solution is coated on the substrates, dried and calcined to form an alignment control film 8, which is then rubbed for aligning the liquid crystal molecules. The rubbing density is adjusted to provide a pretilt angle of 3.3°.

An IPS mode TFT liquid crystal display device with a diagonal of 13.3 inches, a pixel count of 1.024×RGB×768 and an average spacer bead dispersion density of 120 pieces/mm$^2$ is made in the same way as in Example 3. In this Example, the liquid crystal/spacer bead contact angle is 20° and the contact angle with the alignment film in its aligning direction is 6.7°. In the thus composed liquid crystal display device, the spacer beads of the 4-division type shown in FIG. 1 with a light leakage contribution of $7.3 \times 10^{-5}$ (%·mm$^2$/piece) emerge almost over the whole surface. Thereby a liquid crystal display device showing very good dark level and a contrast of 305 can be obtained.

If the liquid crystal/spacer contact angle is 90° or less, the liquid crystal can fill up the cavity on the spacer bead surface, so that a smooth surface is provided in which a certain portion is the solid of the space bead surface and another portion is composed of the liquid crystal. Since the liquid crystal/liquid crystal contact angle is 0°, the apparent contact angle decreases. This accounts for the effect of reducing the contact angle from 41° to 20° in the instant embodiment. Therefore, when the liquid crystal/spacer contact angle is 70° to 90°, the spacer beads composed of a high-molecular weight compound may be used by mixing therewith the ceramic particles, glass fibers or the like, stirring the mixture and separating the beads. It is to be noted that when the liquid crystal/spacer contact angle exceeds 90°, the liquid crystal is incapable of filling up the cavity on the spacer surface, so that a certain portion becomes the solid of the spacer bead surface while another portion is turned into air, resulting in an increase of apparent contact angle. Therefore, the liquid crystal/spacer contact angle exceeding 90° is impracticable.

EXAMPLE 9

In order to investigate the liquid crystal/spacer contact angle and the liquid crystal/alignment control film contact angle, a model experiment is carried out using the unit cells. The unit cells are constructed by washing the glass substrates, coating the substrates with the polyimide-based alignment films produced by Nissan Chemical Co., Ltd., Hitachi Chemical Co., Ltd., Chisso Corp., etc., changing wettability of the alignment control film in its alignment controlling direction and in the direction orthogonal thereto, scattering the spacers on the film-coated substrates and sealing the peripheral portions to make the empty cells. After the sealant is cured, the liquid crystal is encapsulated and the deflectors are set in position to construct the unit cells.

As the liquid crystal, the liquid crystal compositions produced by Merck & Co., Ltd., Chisso Corp. and Lodic Co., Ltd. were used. As the spacers, those employed in Examples 1 to 8 and the commercial products available from Sekisui Chemical Co., Ltd., Kao Corp. and Natoco Paint Co., Ltd. were used. Light leakage is determined by a method in which the contact angles are measured in the manner described above and a combination of the unit cells that provides the desired contact angles are assembled. In the IPS mode normally closed liquid crystal display devices, light leakage can be determined at the dark level where no electric field is applied, so that the amount of light leakage determined by this method is equal to the value obtained from the measurement on a full-fledged IPS mode liquid crystal display device. Therefore, the contrast ratio of the IPS mode liquid crystal display devices can be predicted from this method. Since this method is designed for the model experiments, it is possible to carry out an experiment using model liquid crystal for close investigation of the liquid crystal/spacer contact angle.

In this way, various types of unit cells are manufactured and investigated. As a result, it is found that when the liquid crystal/spacer contact angle is made smaller than 60°, the liquid crystal molecules on the spacer surface substantially assume parallel alignment and it is possible to let the 4-division type spacers emerge preferentially. On the other hand, when the liquid crystal/spacer contact angle exceeds 80°, the liquid crystal molecules on the spacer surface assume vertical alignment regardless of anchoring of the alignment control film and other conditions, and consequently, as noted in Comparative Example 2, light leakage centering around each spacer is increased. When the said contact angle is within the range of 60° to 80°, the liquid crystal molecules on the spacer surface can take either horizontal or vertical alignment depending on the other factors such as anchoring and pretilt angle of the alignment control film. In this case, the latter of the above-mentioned two phenomena relating to the spacers, viz. degradation of image quality due to the presence of the spacers with large and small light leakage, is called in question. It is also a matter of concern that alignment around the spacer is unstable and subject to change with time.

Thus, in order to provide parallel alignment of the liquid crystal molecules on the spacer surface, it is necessary to make the liquid crystal/spacer contact angle not greater than 60°.

The results of the instant embodiment are shown in Table 1. In this way, there were acquired means for obtaining the objective high-image-quality IPS mode liquid crystal displays.

sively to induce a strong tendency to assume horizontal alignment and also the liquid crystal/alignment control film contact angle is reduced radically, the liquid crystal molecules in the region indicated by numeral 48 in FIG. 1 are stabilized in their horizontal alignment on the spacer surface and consequently the 2-division type prevails. It is thus seen that it is important to control the value of liquid crystal/alignment control film contact angle, especially in case the liquid crystal/spacer contact angle is extremely small.

EXAMPLE 10

Figure 12:
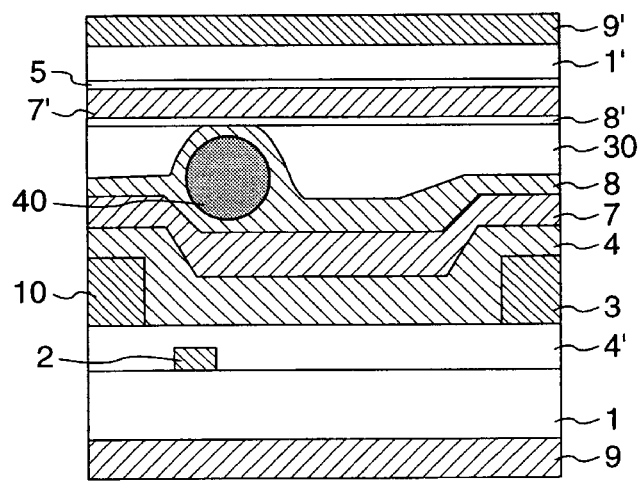
FIG. 12 is a schematic sectional illustration of a liquid crystal display device according to another embodiment of the present invention.

A schematic sectional illustration of a liquid crystal display device embodying the present invention is shown in FIG. 12.

In this liquid crystal display device, common electrodes 2 adapted to apply a voltage of a fixed waveform independently of the picture signal and scanning wiring electrodes are provided on the lower one (numeral 1) of a pair of substrates 1, 1'. Overlaid on these electrodes is an insulating film 4' made of silicon nitride, and on this insulating film 4' are provided pixel electrodes 3 which are varied in wave-

TABLE 1

| Run No. | Contact angle with liquid crystal (°) | | | Light leakage | Features of liquid crystals and spacers | Evaluation |
|---|---|---|---|---|---|---|
| | Spacer | Alignment controlling direction | Orthogonal direction | | | |
| 1 | 85 | 7 | 15 | $97 \times 10^{-4}$ | *2 | X |
| 2 | 15 | 5 | 10 | $0.7 \times 10^{-4}$ | *3 23.8 mN/m | ○ |
| 3 | 70 | 3 | 8 | *1 | *4 | X |
| 4 | 58 | 3 | 8 | $0.92 \times 10^{-4}$ | *5 | ○ |
| 5 | 8 | 5 | 10 | $0.85 \times 10^{-4}$ | *6 | ○ |
| 6 | 8 | 3 | 5 | *1 | *7 | X |

Note)
*1: Emergence of 2-division type
*2: Neutral liquid crystals
*3: Cyano + fluorine liquid crystals
*4: Divinylbenzene spacer
*5: Liquid crystal of Run No. and spacer of Example 1
*6: Cyano + fluorine liquid crystals; Spacer of Example 1
*7: Same liquid crystals and spacers as used in Example 1; Change of alignment film rubbing conditions The following facts are clarified from the above results.

The neutral liquid crystal having no polar group has a stronger inclination to assume vertical alignment. This is considered attributable to the wetting agent-like action of the functional group having polarity on the spacer surface. Also, by introducing a functional group such as alkyl group or hydroxyl group to the spacer surface as in Run Nos. 3 and 4, it is possible to improve wettability and to obtain a positive effect in reducing light leakage due to the spacers. This owes to the fact that the functional group on the spacer surface has the function of a wetting agent. It can thus be learned that it is effective to introduce to the liquid crystal or spacer surface a functional group acting like a wetting agent which betters wettability of both the liquid crystal and the spacer surface. These effects are attributable to the difference between them in intermolecular attraction and individual cohesive force, so that the desired result can be obtained by offering a combination that strengthens intermolecular attraction. These features are not limited to the compounds in the instant embodiment of the present invention.

The pretilt angle of Run No. 6 is almost 0°. It is noted that if the liquid crystal/spacer contact angle is reduced excesform according to the picture signal and signal distributor 10 which issues picture signal to the pixel electrodes. Overlaid on these electrodes are another insulating film 4 made of silicon nitride and a transparent organic polymer film 7 in this order. On said organic polymer film 7 are provided an alignment control film 8 and spacer beads 40, said alignment control film 8 being partly disposed between each spacer bead 40 and a liquid crystal layer 30. Also, this alignment control film 8 is made of a material which can be provided with a liquid crystal aligning function by irradiation with polarized light. A polarizer 9 is provided on the underside of the substrate 1.

On the lower side of the other substrate 1' is provided a color filter 5 for making color display, and an organic polymer film 7' and an alignment control film 8' are laid underneath said color filter 5. A polarizer 9' is provided on the upper side of this substrate 1'.

Figure 13:
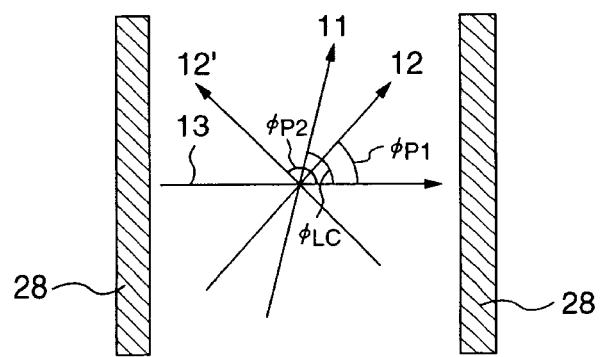
FIG. 13 illustrates setting of the alignment direction and polarization direction of a liquid crystal display device in an embodiment of the present invention.

FIG. 13 shows the aligning direction of the alignment control film and the polarization axis of the polarizer.

In this figure, the angles made by the polarizers with the direction of electric field 13 are indicated by Φp1 and Φp2 and the angle made by the alignment direction with the direction of electric field is indicated by ΦLC. In this Example, the above angles are set to be ΦLC=75°, Φp1=30° and Φp2=120°. That is, the angular setting is made to provide the normally open display characteristics. In FIG. 13, reference numeral 11 indicates the alignment direction, 12 the polarized light transmission axis of one of the polarizers, 12' the polarized light transmission axis of another polarizer which crosses the transmission axis 12 at right angles, and 28 is a strip electrode.

Figure 18:
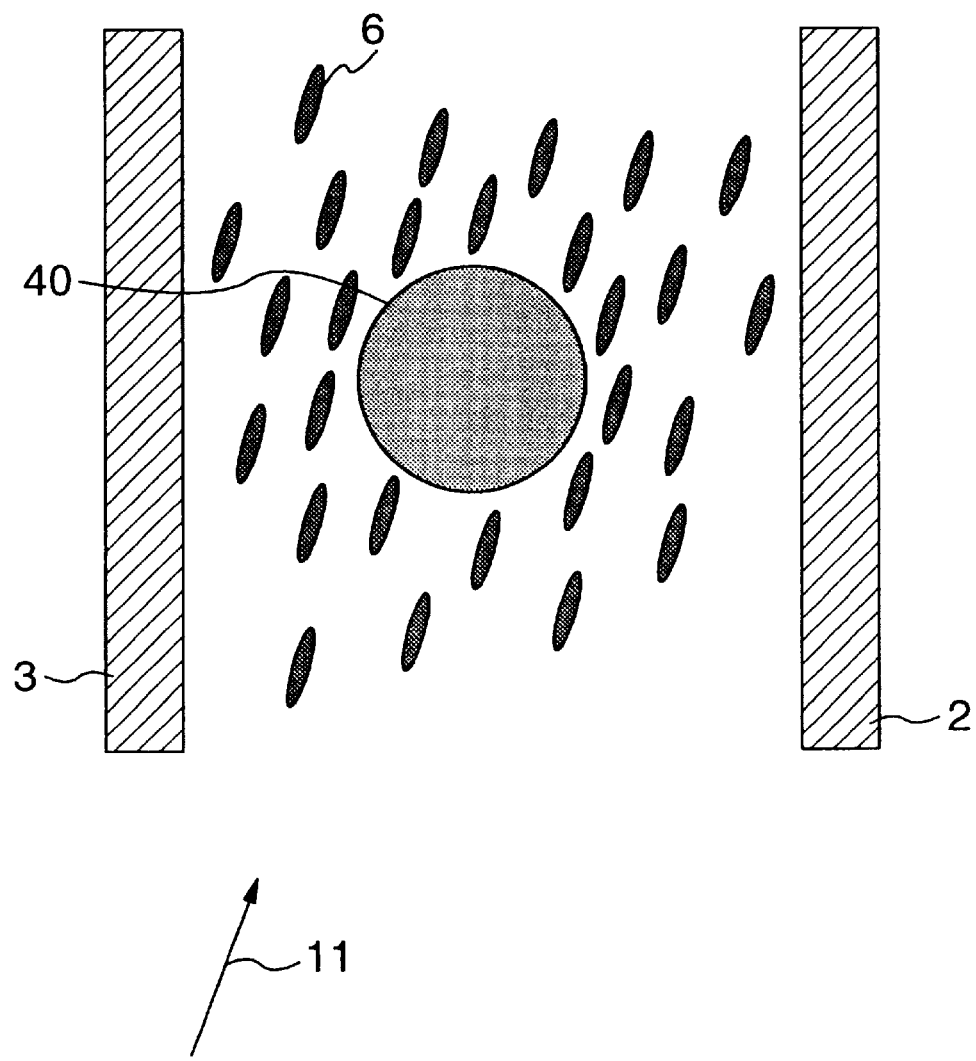
FIG. 18 a schematic frontal view of a spacer bead and its circumferential area in a liquid crystal display device in an embodiment of the present invention.

FIG. 18 shows a frontal view taken from the direction vertical to the panel plane, which schematically illustrates the alignment direction of the liquid crystal molecules around a spacer bead in the liquid crystal display device according to the instant embodiment of the invention.

No alignment control film is shown in this figure, but since a liquid crystal aligning force is provided between each spacer bead 40 and the liquid crystal layer by polarized light irradiation, the liquid crystal layer around each spacer bead won't be disturbed in its alignment and the liquid crystal molecules are aligned in the same direction as the aligning direction of the alignment control film. This greatly contributes to the reduction of light leakage around the spacer beads and the consequent improvement of contrast.

A process for producing this liquid crystal display device is shown below.

The procedure till formation of the pixel electrodes 3, common electrodes 2 and insulating film 4 is the same as in the conventional process for producing an IPS mode liquid crystal display device, but the process of the present invention is different in that a transparent organic polymer film 7, alignment control film 8 and spacer beads 40 are produced in the following way.

The organic polymer film 7 is formed by applying on the insulating film 4 a polyamic acid solution of PIQ-1800 (an amorphous film produced by Hitachi Chemical Co., Ltd.) diluted to a 8.5% concentration, and heating it at 150° C. for 10 minutes to evaporate the solvent. This organic polymer film 7 is provided for securing adhesion of the alignment control film to the insulating film or the electrodes, but it may not be provided when secure adhesion can be provided by merely imidizing the alignment control film. Provision of said film 7 also proves useful for flattening the assembly structure.

Spacer beads 40 are provided after forming the organic polymer film by dispersing the polymeric spacer beads of 4 μm in particle size on the substrate by the dry scatter method. The "dry scatter method" used in the present invention is a method in which a negative pressure is produced in the nozzle section by discharging an inert gas from a compressed gas supply pipe to suck up and scatter the spacer beads for liquid crystal display devices from a spacer bead supply pipe. In this method, no solvent is used as spacer beads dispersing medium.

Alignment control film 8 is formed after dispersion of the spacer beads 40 by applying a 3% solution of polyamic acid, and calcining the coating at 200° C. for 30 minutes for imidization. The precursor of the alignment control film 8 is polyamic acid which is a polyimide precursor. Polymeric acid is synthesized using an equimolar mixture of 4,4'-diaminoazobenzene containing diazobenzene groups and 4,4'-diaminophenylmethane as diamine moiety and pyromellitic acid dianhydride and 1,2,3,4-cyclobutanetetracarboxylic acid dianhydride as acid anhydrides. In the instant embodiment of the present invention, azobenzene groups such as described in U.S. Pat. No. 4,974,941, which is herein fully incorporated by reference, are introduced into the composition to afford photo-isomerization reactivity, but other groups, preferably stilbene group or the like, may be applied if they have photo-isomerization reactivity and an ability to control liquid crystal alignment.

After formation of said polyimde precursor film (organic polymer layer), dispersion of the spacer beads and formation of another polyimide precursor film (alignment control layer) have been completed, imidization was effected by calcination.

Imidization after coating of the spacer bead surfaces with the alignment control film 8 makes it possible to prevent transfer of the spacer beads.

The substrate on the lower side is placed in registration with the upper side substrate and the peripheral parts are sealed to form a liquid crystal cell.

The liquid crystal cell is irradiated externally with polarized light from a high pressure mercury lamp through a polarizing film at an irradiation dose of 2 J/cm². Then the liquid crystal composition is encapsulated at room temperature and annealed at 100° C. for 10 minutes to obtain liquid crystal alignment of the direction substantially vertical to the polarized light direction. The long axial direction of the liquid crystal molecules in the produced state of alignment was set so that the angle ΦLC defined in FIG. 13 becomes 75°. In this way, a liquid crystal display device with a liquid crystal layer thickness d of 4.0 μm is obtained. Nematic liquid crystal with positive dielectric anisotropy is used for the liquid crystal composition of the liquid crystal layer. Dielectric anisotropy Δε of the liquid crystal is 10.2 and its refractive anisotropy Δn is 0.073.

Figure 14A:
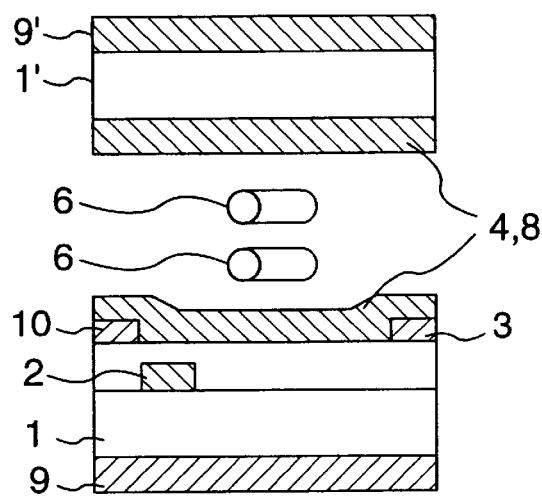
FIGS. 14A to 14D illustrate the principle of switching operation of a liquid crystal display device in an embodiment of the present invention.
Figure 14B:
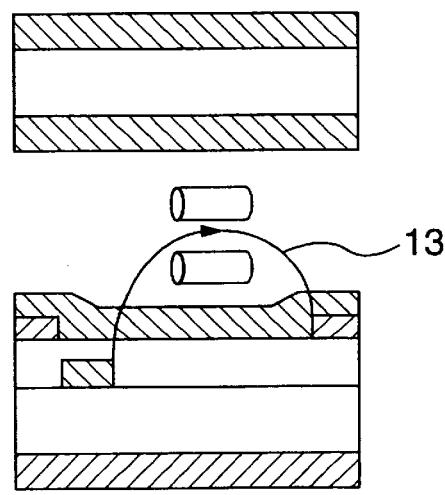
Figure 14C:
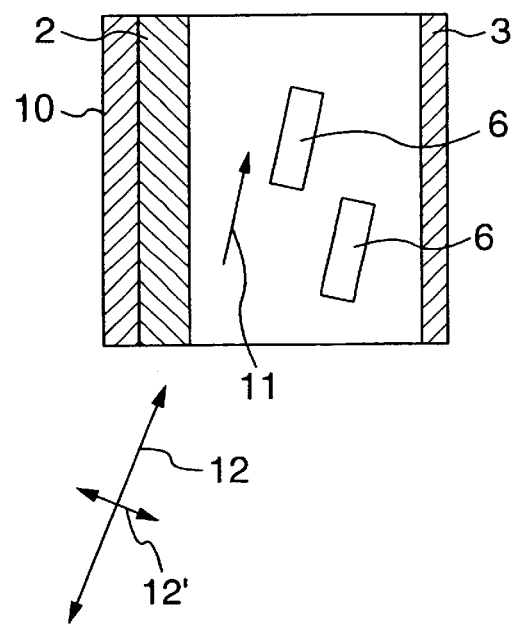
Figure 14D:
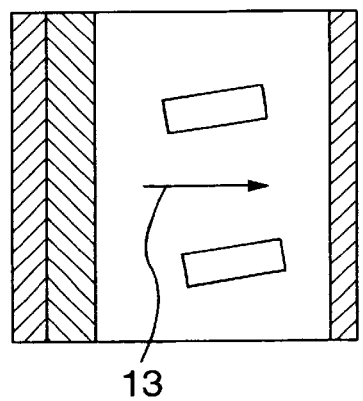

FIGS. 14A to 14D illustrate the switching behavior of the liquid crystal molecules in the thus obtained liquid crystal panel. In the instant embodiment of the invention, the liquid crystal molecules are aligned with the angle ΦLC of 75° against the direction vertical to the longitudinal direction of the strip electrodes when no electric field is applied, but in case dielectric anisotropy of the liquid crystal is positive, it is advised to develop alignment with 45°≦|ΦLC|<90°. The liquid crystal composition of the liquid crystal layer may be of negative dielectric anisotropy. In this case, it is preferable to adjust initial alignment to 0°≦|ΦLC|<45° from the direction vertical to the strip electrodes. In FIGS. 14A to 14D, the long axial direction of the liquid crystal molecules is shown by an arrow 11. When an electric field is applied in the direction 13 between a common electrode 2 and a pixel electrode 3, the liquid crystal molecules 6 are shifted so that the long axes of the molecules will become parallel to the direction of electric field 13 as shown in FIGS. 14B and 14D. Consequently, θ in the formula (1) changes in accordance with electric field strength E, causing corresponding change of transmittance. In this Example, since birefrigent mode display system is employed, liquid crystal is held between a pair of crossed polarizers.

Further, in order to produce a normally closed system where dark display is given at low voltage, the polarized light transmission axis 12 of one of the polarizers is set parallel to the initial alignment direction 11 while the polarized light transmission axis 12' of the other polarizer is set to cross the initial alignment direction 11 at right angles as shown by arrows in FIG. 14C. The observed transmitted light strength is given by the formula (1).

FIGS. 15A to 15C show the layout of a unitary pixel section in the instant embodiment of the present invention, said unitary pixel section comprising a group of electrodes including a common electrode 2, a pixel electrode 3, a picture signal electrode 10 and a scanning electrode 14, amorphous silicon 16, a thin-film transistor 15, an insulating film 4, an alignment control film 8, an organic polymer film 7, and a display zone 31 where display is made on application of an electric field from the common and pixel electrodes 2, 3. FIG. 15A is a frontal view taken from the direction vertical to the panel plane, and FIGS. 15B and 15C are the side sectional views.

Figure 16:
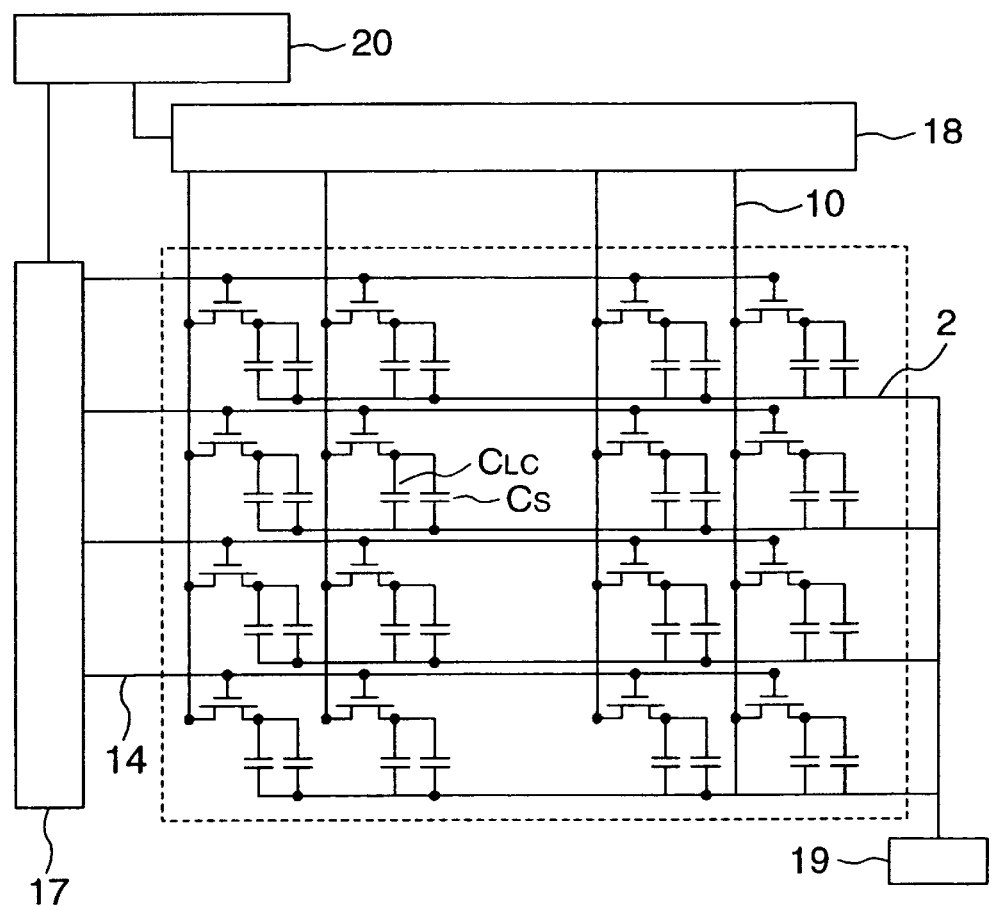
FIG. 16 illustrates the circuit system in a liquid crystal display device in an embodiment of the present invention.

FIG. 16 shows the circuit system in the liquid crystal display device according to the instant embodiment of the invention, said circuit system comprising vertical scanning signal circuit 17, picture signal circuit 18, common electrode driving circuit 19, power circuit and controller 20.

Figure 17:
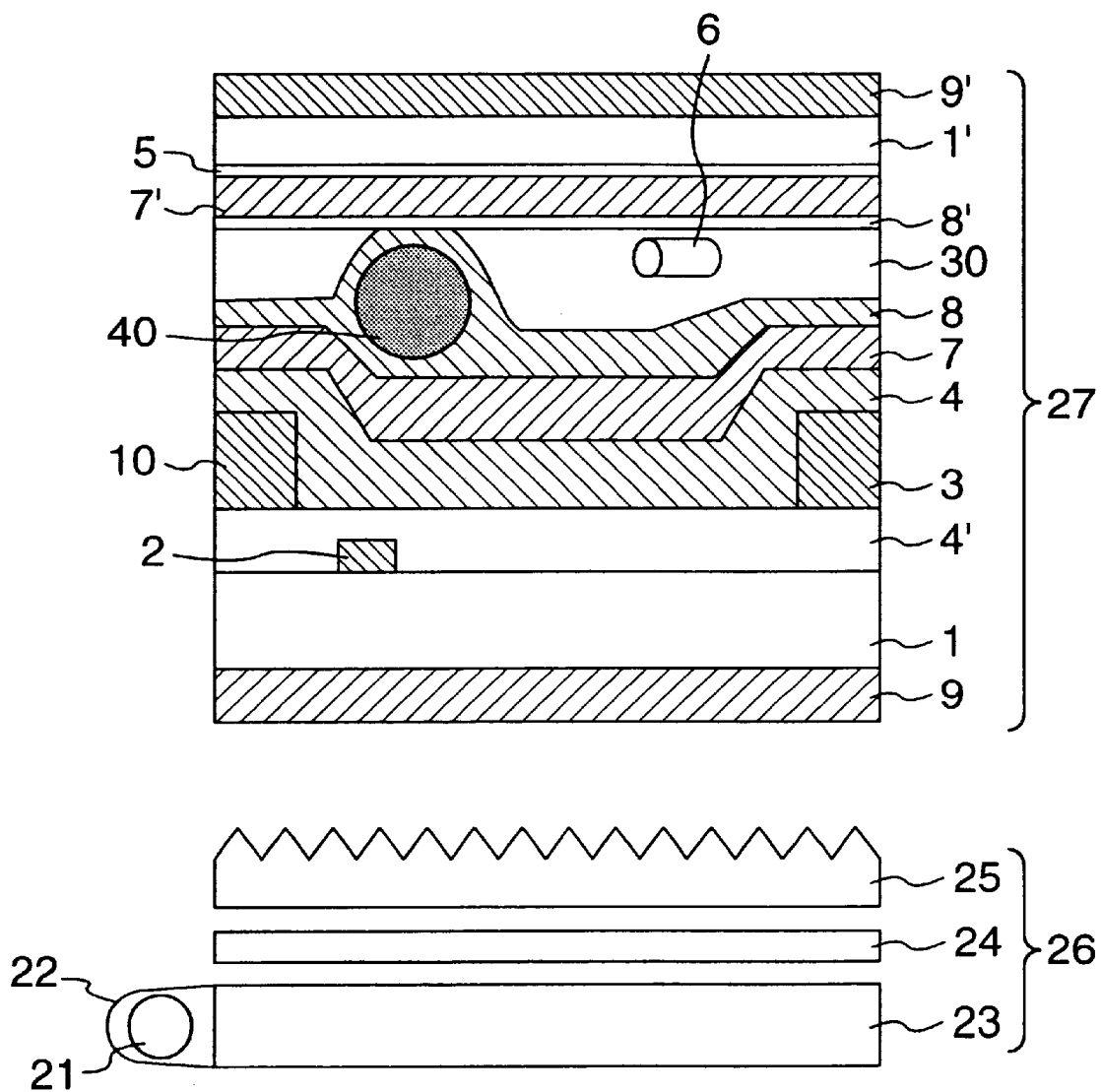
FIG. 17 illustrates the optical system in a liquid crystal display device in an embodiment of the present invention.

FIG. 17 shows the optical system in the liquid crystal display device.

A back light unit 26 comprising a light source 21, a light cover 22, a photoconductor 23 and a diffuser 24 is provided on the back side of a liquid crystal panel 27. In this embodiment, a prism sheet 25 is provided for increasing frontal luminance. In case no such prism sheet is provided, it is possible to lessen viewing angle dependency of luminance.

FIG. 18 is a frontal view taken from the direction vertical to the panel plane, which schematically illustrates the alignment direction of the liquid crystal molecules around a spacer bead in the liquid crystal display device according to the instant embodiment of the invention. Since the alignment control film is formed after dispersion of the spacer beads and its alignment controlling ability is provided by irradiation with polarized light from a high pressure mercury lamp, the surface of the portion of each spacer bead contacted with liquid crystal is covered with the alignment control film as shown in FIG. 12. Consequently, the liquid crystal layer around each spacer bead is not disturbed in its alignment and the liquid crystal molecules are aligned in the same direction as the aligning direction of the alignment control film. This greatly contributes to the reduction of light leakage around the spacer beads.

Light leakage contribution in the instant embodiment is $1.0 \times 10^{-5}$ (%·mm$^2$/piece). At this level, even if the spacer bead dispersion density is supposed to be as high as 1,000 pieces/mm$^2$, the increase of transmittance is only 0.01%. It is noted that in the liquid crystal display device of this Example the influence of the spacer beads on dark display is very small. "Trasmittance" referred to herein is defined to be transmittance of the display pixel region. Actual transmittance of a liquid crystal display device is subject to the influence of light leakage due to the factors other than the spacer beads, aperture ratio of color filter or display zone, pixel edge, etc. Therefore, transmittance shown herein is that in a state free of such influence.

Under the above conception, a prototype of IPS mode TFT liquid crystal display device with a diagonal of 13.3 inches, a pixel count of 1,024×RGB×768 and a spacer bead dispersion density of about 120 (pieces/mm$^2$) is manufactured. There is obtained a liquid crystal display device showing fine-level black display and a contrast ratio of 300.

EXAMPLE 11

10 g of the polymeric spacer beads having a particle size of 4.0 μm and composed of divinylbenzene-styrene copolymer resin is immersed in a solution of 30 g of 2% hydrochloric acid and 30 g of isopropyl alcohol, to which a solution of 3 g of 4-stilbenzenecarboxyaldehyde in 10 g of isopropyl alcohol is added dropwise with stirring. After 2-hour reaction at 50° and successive filtration, the treated spacer beads are immersed in a solution of 70 g of pure water and 30 g of isopropyl alcohol and filtered. The above operation is repeated 10 times and the resulting beads are immersed in 70 g of toluene and filtered, this operation being repeated 5 times followed by drying. Thereby an organic film 42 which can be provided with a liquid crystal aligning ability by irradiation of polarized light is formed on the surface of each spacer bead 40.

A prototype of liquid crystal display device is manufactured using these spacer beads. This prototype is different from that of Example 10 in the following points.

For forming a transparent organic polymer layer, a 8.5% polyamic acid solution of PIQ-1800 (an amorphous film produced by Hitachi Chemical Co., Ltd.) is applied to the substrate and heated at 150° C. for 10 minutes to evaporate the solvent, and then a 3% solution of polyamic acid is applied thereto. The precursor of the alignment control film 8 is polyamic acid which is a polyimide precursor, and the polyamic acid is synthesized using an equimolar mixture of 4,4'-diaminostilbene containing stilbene groups and 4-phenylmethane as diamine compounds and pyromellitic acid dianhydride and 1,2,3,4-cyclobutanetetracarboxylic acid dianhydride as acid anhydrides. The coating is then calcined at 200° C. for 30 minutes for imidization.

Then the spacer beads treated as described above are dispersed on the substrate by the half-dry scatter method. "Half-dry scatter method" is a method in which the spacer beads are dispersed in an alcohol or a water/alcohol mixed solvent and scattered as a mist with a jet of an inert gas. In this operation, the inside of the disperser from the nozzle to the substrate is heated so that the solvent is evaporated before reaching the substrate, allowing the spacer beads alone to deposit on the substrate.

In this Example, imidization by calcination and dispersion of the spacer beads are performed after formation of a polyimide precursor film constituting a transparent organic polymer layer and a polyimide precursor film constituting an alignment control film. Then the upper and lower substrates are placed in registration with each other and the peripheral parts are sealed to make an empty cell-like structure.

Thereafter, the cell is irradiated externally with polarized light through a polarizing film using as light source xenon chloride eximer laser having a peak at 308 nm.

Figure 19:
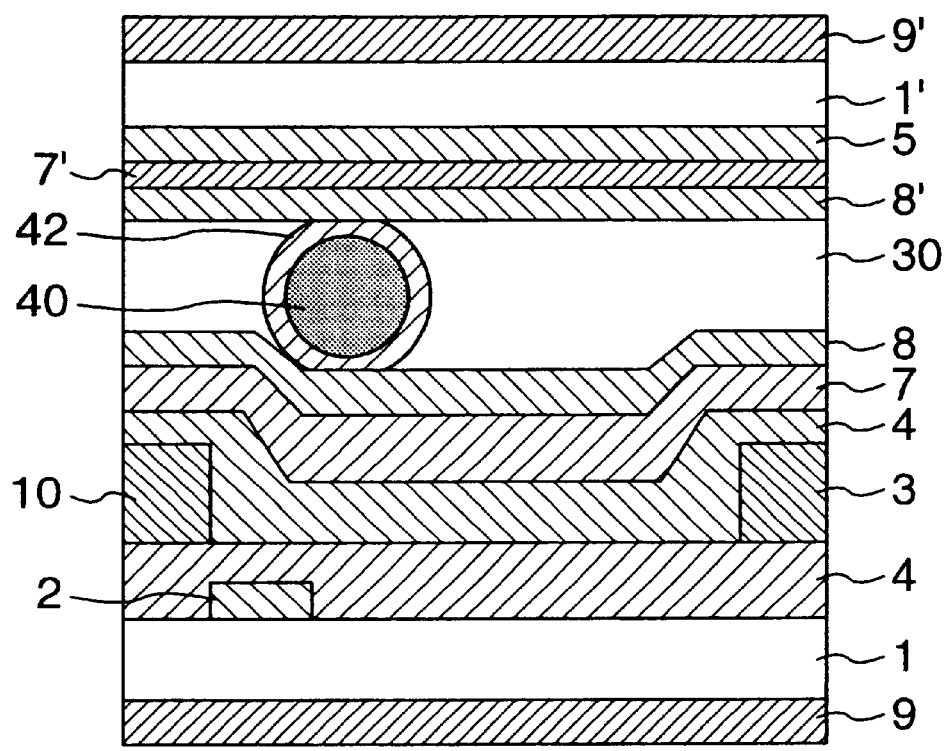
FIG. 19 illustrates the film structure around the group of, electrodes (electrode structure) in a liquid crystal display device in an embodiment of the present invention.

FIG. 19 is an emphasized schematic illustration of the film structure around the group of electrodes in the instant embodiment of the invention. It will be seen that a transparent organic polymer film 7 is laid on an insulating film 4 covering the electrodes 3, 10, and overlaid on said film 7 is an alignment control film 8, on which are disposed the spacer beads 40 each having on its surface a coating film 42 provided with a liquid crystal aligning ability by irradiation with polarized light.

Light leakage contribution L of this unit determined in the same way as in Example 10 is $1.1 \times 10^{-5}$ (%·mm$^2$/piece).

Incorporating the above construction, a prototype of IPS mode TFT liquid crystal display device having a diagonal of 13.3 inches, a pixel count of 1,024×RGB×768 and an average spacer bead distribution density of 100 pieces/mm$^2$ is manufactured in the same way as in Example 10. In this prototype, light leakage due to the spacer beads in dark display is markedly reduced and good uniformity of display with excellent black level is obtained. Contrast ratio is about 300.

Similar treatments can be applied to the spacer beads if they have a hydroxyl group in the surface. When a hydrophilic group is present in abundance in the surface, there exist plenty of binding water and hydroxyl groups derived from this binding water, so that the materials usable for these spacer beads are not limited to the specific types; it is possible to use inorganic materials, for instance, synthetic glass, borosilicate glass, alumina, alumina silicate glass, etc; or organic materials such as epoxy resins, phenol resins, melamine resins, unsaturated polyester resins, divinylbenzene polystyrene resins, divinylbenzene polyester resins, divinylbenzene-acryl ester resins, and diacryl phthalate resins.

Comparative Example 3

For forming a transparent organic polymer layer, a 8.5% polyamic acid solution of PIQ-1800 (an amorphous film produced by Hitachi Chemical Co., Ltd.) is applied to a substrate and heated at 150° C. for 10 minutes to evaporate the solvent, and then a 3% solution of polyamic acid (precursor of the alignment control film 8) is applied, followed by 30-minute calcination at 200° C. for imidization.

Then the silica spacer beads having a particle size of 4 $\mu$m and provided with a strong urging force to let the liquid crystal molecules align horizontally are dispersed on the substrate.

In this Comparative Example, imidization by calcination and dispersion of the spacer beads are conducted after formation of a polyimide precursor film constituting a transparent organic polymer layer and a polyimide precursor film constituting an alignment control layer. Then the upper and lower substrates are placed in position and the peripheral parts are sealed to constitute an empty cell-like structure. With this construction, a prototype of liquid crystal display device is manufactured in the same way as in Example 10. The light leakage contribution is $28.0 \times 10^{-5}$ (%·mm$^2$/piece).

Figure 2:
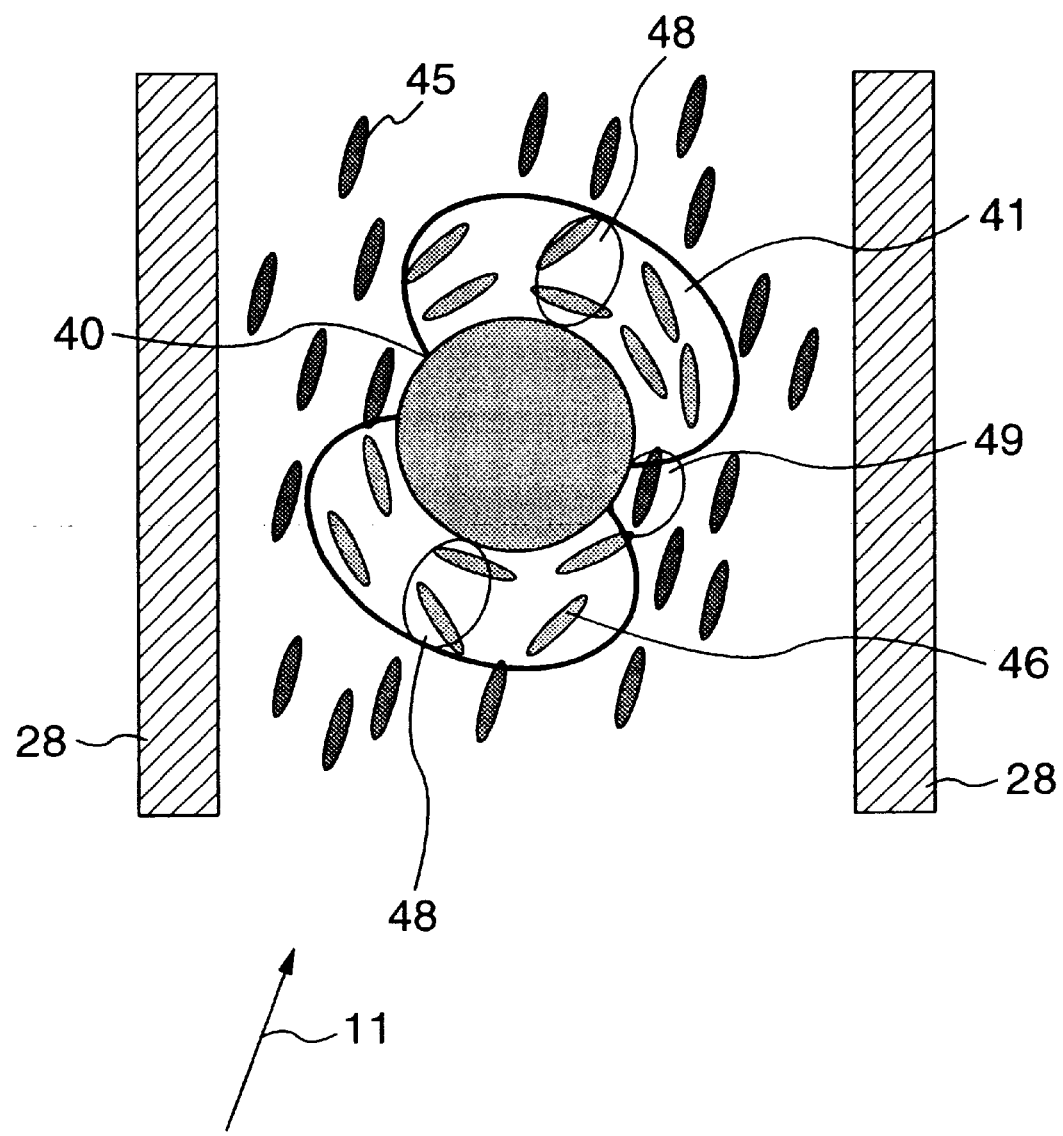
FIG. 2 is a schematic illustration of 2-division alignment of the liquid crystal molecules around a spacer bead in a liquid crystal display device according to the present invention.

In the liquid crystal display device of this Comparative Example, there takes place heavy light leakage around each spacer bead as typically illustrated in the light leakage zone 41 in FIG. 2, and the contrast ratio is 200.

Comparative Example 4

For forming a transparent organic polymer layer, a 8.5% polyamic acid solution of PIQ-1800 is applied to a substrate and heated at 150° C. for 10 minutes to evaporate the solvent, and then a 3% solution of polyamic acid (precursor of the alignment control film 8) is applied, followed by 30-minute calcination at 200° C. for imidization.

Then, the polymeric spacer beads 4 $\mu$m in particle size and having their surfaces chemically modified for expediting vertical alignment of the liquid crystal molecules are dispersed on the substrate by the dry scatter method.

In this Comparative Example, imidization by calcination and dispersion of the spacer beads are conducted after formation of a polyimide precursor film constituting a transparent organic polymer layer and a polyimide precursor film constituting an alignment control layer. Then the upper and lower substrates are placed in registration with each other and the peripheral parts are sealed to constitute an empty cell-like structure. With this construction, a prototype of liquid crystal display device is manufactured in the same way as in Example 10. This model shows a light leakage contribution of $95.0 \times 10^{-5}$ (%·mm$^2$/piece).

EXAMPLE 12

This Example differs from Example 10 in the following points.

For forming a transparent organic polymer layer, a 8.5% polyamic acid solution of PIQ-1800 is applied and heated at 150° C. for 10 minutes to evaporate the solvent, and then a 3% solution of polyamic acid, which is the alignment control film precursor having the 4 $\mu$m polymeric spacer beads dispersed therein, is applied. The polyamic acid is the same as used in Example 10. Thereafter, the coating is calcined at 200° C. for 30 minutes for imidization.

In this Example, imidization by calcination is conducted after formation of a polyamide precursor film constituting a transparent organic polymer layer and an alignment control film by application of a spacer beads-dispersed polyimide precursor. Then the upper and lower substrates are set in position and the peripheral parts are sealed to constitute an empty cell-like structure. Light leakage contribution of this unit is $1.0 \times 10^{-5}$ (%·mm$^2$/piece).

With the above construction, a prototype of IPS mode TFT liquid crystal display device having a diagonal of 13.3 inches and a pixel count of 1,024×RGB×768 is manufactured in the same way as in Example 10. Light leakage due to the spacer beads in dark display reduces remarkably, and the display device shows excellent black level and a contrast ratio of 300.

EXAMPLE 13

10 g of the polymeric spacer beads having a particle size of 4.0 $\mu$m are immersed in 100 g of a THF solution containing equimolar amounts of 3-aminopropyldiethoxysilane, 4'-propylstilbene-4-carbonyl chloride and triethylamine, and the solution is stirred at 50° C. for 2 hours, filtered, washed with THF and dried. The thus obtained spacer beads show a light leakage contribution of $1.2 \times 10^{-5}$ (%·mm$^2$/piece).

Using these space beads, a trial model of liquid crystal display device is manufactured in the same way as in Example 11.

With the above construction, a prototype of IPS mode TFT liquid crystal display device having a diagonal of 13.3 inches and a pixel count of 1,024×RGB×768 is manufactured. Light leakage due to the spacer beads in dark display reduces remarkably, and the display device shows excellent black level, good uniformity of display and a contrast ratio of 295.

The above treatment can be applied to the spacer beads if they have hydroxyl groups on the surface. When hydrophilic groups are present in abundance on the surface, there exist plenty of binding water and hydroxyl groups derived from this binding water, so that the materials usable for the spacer beads are not limited to the specific types; it is possible to use, for instance, inorganic materials such as synthetic glass, borosilicate glass, alumina, alumina silicate glass, etc.; and organic materials such as epoxy resins, phenol resins, melamine resins, unsaturated polyester resins, divinylbenzene polystyrene resins, divinylbenzene polyester resins, divinylbenzene-acryl ester resins, diacryl phthalate resins, etc.

EXAMPLE 14

10 g of the polymeric spacer beads, 4.0 $\mu$m in particle size, are immersed in 100 g of a THF solution containing equimolar amounts of 3-aminopropyldiethoxy-methylsilane, 4-(4-pentylphenylazo)benzoyl chloride and triethylamine, stirred at 50° C. for 2 hours, filtered, washed with THF and dried.

Using these spacer beads, a prototype of liquid crystal display device is manufactured in the same way as in Example 12.

For forming a transparent organic polymer layer, a 8.5% polyamic acid solution of PIQ-1800 is applied to a substrate and heated at 150° C. for 10 minutes to evaporate the solvent, and then a 3% solution of polyamic acid, the precursor of the alignment control film 8, is coated. The precursor of the alignment control film 8 is polyamic acid which is the polyimide precursor. This polyamic acid is synthesized using an equimolar mixture of 4,4'-diaminoazobenzene containing azobenzene groups and 4,4'-diaminophenylmethane as diamine compounds and pyromellitic acid dianhydride and 1,2,3,4-cyclobutanetetracarboxylic acid dianhydride as acid anhydrides. The coating is calcined at 200° C. for 30 minutes for imidization.

The spacer beads treated as described above are dispersed on the substrate by the half-dry scatter method. "Half-dry scatter method" is a method in which the spacer beads are dispersed in an alcohol or a water/alcohol mixed solvent and scattered in the form of a mist with a jet of an inert gas. In this operation, since the inside of the dispenser from its nozzle through the distance to the substrate is heated, the solvent is evaporated before reaching the substrate, allowing the spacer beads alone to deposit on the substrate.

In this Example, imidization by calcination and dispersion of the spacer beads are conducted after formation of a polyimide precursor film constituting a transparent organic polymer layer and a polyimide precursor film constituting an alignment control layer. Then the upper and lower substrates are placed in position and the peripheral part is sealed to constitute an empty cell-like structure. Light leakage contribution of the cell is $0.9 \times 10^{-5}$ (%·mm$^2$/piece).

With the above construction, a prototype of IPS mode TFT liquid crystal display device having a diagonal of 13.3 inches and pixel count of 1,024×RGB×768 is manufactured in the same way as in Example 10. This prototype is markedly reduced in light leakage due to the spacer beads in dark display and shows excellent black level and a contrast ratio of 320.

The same treatment can be applied to the spacer beads if they have hydroxyl groups on the surface. When hydrophilic groups are present in abundance on the surface, there exist plenty of binding water and hydroxyl groups derived therefrom, so that the materials usable for the spacer beads are not limited to the specific types; it is possible to use, for instance, inorganic materials such as synthetic glass, borosilicate glass, alumina, alumina silicate glass, etc.; and organic materials such as epoxy resins, phenol resins, melamine resins, unsaturated polyester resins, divinylbenzene polystyrene resins, divinylbenzene polyester resins, divinylbenzene-acryl ester resins, diacryl phthalate resins, etc.

EXAMPLE 15

Equimolar amounts of diethoxy-3-glycidoxypropylmethylsilane and 4-(4-propylphenylazo)aniline are mixed, stirred and evaporated, and the produced compound is dissolved in ethanol. The polymeric spacer beads of 4.0 μm in particle size are immersed in the solution, stirred at 50° C. for 2 hours, filtered, washed with ethanol and dried. Light leakage contribution is $1.3 \times 10^{-5}$ (%·mm$^2$/piece).

Using these beads, a prototype of IPS mode TFT liquid crystal display device with a diagonal of 13.3 inches and a pixel count of 1,024×RGB×768 is manufactured in the same way as in Example 5. Light leakage due to the spacer beads in dark display markedly reduces, and the prototype shows excellent black level and a contrast ratio of 280.

The same treatment can be applied to the spacer beads if they have the hydroxyl groups on the surface. When the hydrophilic groups are present in abundance on the surface, there exist plenty of binding water and the hydroxyl groups derived therefrom, so that the materials usable for the spacer beads are not limited to the specific types; it is possible to use, for instance, inorganic materials such as synthetic glass, borosilicate glass, alumina, alumina silicate glass, etc.; and organic materials such as epoxy resins, phenol resins, melamine resins, unsaturated polyester resins, divinylbenzene polystyrene resins, divinylbenzene polyester resins, divinylbenzene-acryl ester resins, diacryl phthalate resins, etc.

EXAMPLE 16

10 g of the polymeric spacer beads, 3.8 μm in particle size, are immersed in 100 g of a THF solution containing equimolar amounts of 3-aminopropyldiethoxymethylsilane, 4-(4-pentylphenylazo)benzoyl chloride and triethylamine, stirred at 50° C. for 2 hours, filtered, washed with THF and dried.

Using these spacer beads, a prototype of liquid crystal display device is manufactured.

A distinctive feature of this embodiment is that the alignment control film 8 has no light aligning ability and does not absorb light used for light alignment. In this embodiment, polyamic acid is prepared using 1,2,3,4-cyclopentenetetracarboxylic acid dianhydride, 1,2,4,5-cyclohexanetetracarboxylic acid dianhydride, 3,3',4,4'-biscyclohexanetetracarboxylic acid dianhydride, 3,3',4,4'-benzophenonetetracarboxylic acid dianhydride or the like as acid anhydride and 4,4'-diaminodiphenyl sulfide, 3,3'-diaminodiphenyl sulfide, 1,4-diaminocyclohexane, 3,3'-diaminodiphenyl sulfone or the like as diamine, and this solution is applied to a substrate, dried and calcined to form an alignment control film 8, and rubbed for aligning the liquid crystal molecules. These acid anhydrides and diamine compounds may be used either singly or by mixing two or more of them as desired.

The spacer beads treated as described above are dispersed on the substrate by the half-dry scatter method. "Half-dry scatter method" is a method in which the spacer beads are dispersed in an alcohol or a water/alcohol mixed solvent and scattered in the form of a mist with a jet of an inert gas. In this operation, since the inside of the disperser from the nozzle through the distance to the substrate is heated, the solvent is evaporated before reaching the substrate, allowing the spacer beads alone to deposit on the substrate.

In this Example, imidization by calcination and dispersion of the spacer beads are conducted after formation of a polyimide precursor film constituting a transparent organic polymer layer and a polyimdie precursor film constituting an alignment control film. Then the upper and lower substrates are placed in position and the peripheral part is closed by a sealant to constitute an empty cell-like structure.

Then the cell is irradiated externally with polarized light from a high-pressure mercury lamp through a polarizing film. Thereby the modified film on the spacer bead surface is provided with a liquid crystal aligning ability and the liquid crystal molecules on the spacer bead surface are aligned in the same direction as the rubbing direction. Light leakage contribution of the cell is $0.9 \times 10^{-5}$ (%·mm$^2$/piece).

With the above construction, a prototype of IPS mode TFT liquid crystal display device with a diagonal of 13.3 inches and a pixel count of 1,024×RGB×768 is manufactured in the same way as in Example 10. Light leakage due to the spacer beads in dark display markedly reduces, and this prototype also shows excellent black level and good uniformity of display with a contrast ratio of 320.

EXAMPLE 17

In this Example, the polymeric spacer beads 40 with a particle size of 4 μm are dispersed on the substrate by the dry scatter method without forming an organic polymer film 7.

Then a 3% solution of polyamic acid (precursor of the alignment control film 8) is applied, followed by 30-minute calcination at 200° C. for imidization. The precursor of the alignment control film 8 is polyamic acid which is a polyimide precursor, and it is synthesized using an equimolar mixture of 4,4'-diaminobenzene containing diazobenzene groups and 4,4'-diaminophenylmethane as diamine compounds and pyromellitic acid dianhydride and 1,2,3,4-cyclobutanetetracarboxylic acid dianhydride as acid anhydrides.

In this Example, imidization by calcination is conducted after dispersion of the spacer beads and formation of a polyimide precursor film constituting an alignment control layer, and a trial model of liquid crystal display device is manufactured in the same way as in Example 10. Light leakage contribution is $1.1\times10^{-5}$ (%·mm$^2$/piece).

With the above construction, a prototype of IPS mode TFT liquid crystal display device with a diagonal of 13.3 inches and a pixel count of 1,024×RGB×768 is manufactured. Light leakage due to the spacer beads in dark display reduces remarkably, and this prototype also shows excellent black level and a contrast ratio of 300.

According to the present invention, as described above, a high-contrast normally closed type in-plane switching mode liquid crystal display device which is operated by applying to the liquid crystal layer an electric field in the direction substantially parallel to the substrates is realized.

What is claimed is:

1. A normally closed liquid crystal display device comprising:
   a pair of substrates at least one of which is transparent,
   a liquid crystal layer disposed between said pair of substrates,
   a group of electrodes for applying to said liquid crystal layer an electric field substantially parallel to the substrate plane and one or more active elements connected to said electrodes, said group of electrodes and active elements being formed on one of said pair of substrates,
   an alignment control film formed on said pair of substrates, and
   an optical means for changing the optical properties according to the state of molecular alignment of said liquid crystal layer,
   wherein the thickness of said liquid crystal layer is controlled to be substantially uniform by the spacer beads dispersed and held between said pair of substrates, a pretilt angle between said alignment control film and liquid crystals is 4° or less, and a contact angle between said liquid crystals and said spacer is 0° to 60°.

2. A normally closed liquid crystal display device comprising:
   a pair of substrates at least one of which is transparent,
   a liquid crystal layer disposed between said pair of substrates,
   a group of electrodes for applying to said liquid crystal layer an electric field substantially parallel to the substrate plane and one or more active elements connected to said electrodes, said group of electrodes and active elements being formed on one of said pair of substrates,
   an alignment control film formed on said pair of substrates, and
   an optical means for changing the optical properties according to the state of molecular alignment of said liquid crystal layer,
   wherein the thickness of said liquid crystal layer is controlled to be substantially uniform by the spacer dispersed and held between said pair of substrates, a pretilt angle between said alignment control film and liquid crystals is 3° or less, and a contact angle between said liquid crystals and said spacer is 0° to 60°.

3. A normally closed liquid crystal display device according to claim 1 or 2, which is characterized in that a contact angle between said liquid crystals and an alignment control direction of said alignment control film and a contact angle between said liquid crystals and a right-angle direction as to the alignment control direction have anisotropy, and the former contact angle is smaller than the latter contact angle.

4. A normally closed liquid crystal display device comprising:
   a pair of substrates al least one of which is transparent,
   a liquid crystal layer disposed between said pair of substrates,
   a group of electrodes for applying to said liquid crystal layer an electric field substantially parallel to the substrate plane and one or more active elements connected to said electrodes, said group of electrodes and active elements being formed on one of said pair of substrates,
   an alignment control film formed on said pair of substrates, and
   an optical means for changing the optical properties according to the state of molecular alignment of said liquid crystal layer,
   wherein the thickness of said liquid crystal layer is controlled to be substantially uniform by the spacer dispersed and held between said pair of substrates, a pretilt angle between said alignment control film and liquid crystals is 3° or less, and the contact angle between said liquid crystals and said spacer is larger than a contact angle between said liquid crystals and the alignment control direction of said alignment control film, and is smaller than the contact angle between said liquid crystals and the right angle direction as to the alignment control direction of said alignment control film.

5. A normally closed liquid crystal display device according to claim 4, wherein the contact angle between said liquid crystals and said spacer is less than 10°.

6. A normally closed liquid crystal display device according to claim 4, wherein the contact angle between said liquid crystals and the alignment direction of said alignment control film is 0° to 5°.

7. A normally closed liquid crystal display device according to claim 5 or 6, wherein the contact angle between said liquid crystals and the right angle direction as to the alignment control direction of said alignment control film is 10° or more.

8. A normally closed liquid crystal display device according to claim 1, 2 or 4, wherein said spacer has a roughened surface.

9. A normally closed liquid crystal display device according to claim 8, wherein the spacer has a surface wherein functional groups showing hydrophilic property and functional groups showing hydrophobic property are introduced, and is roughened by this surface layer.

10. A normally closed liquid crystal display device according to claim 9, wherein the contact angle between a material constituting said spacer and said liquid crystals is less than 90°.

11. A normally closed liquid crystal display device according to claim 1, 2 or 4, wherein the amount of adhesion work between said liquid crystals and said spacer is 0.05 N/m or more.

12. A normally closed liquid crystal display device according to claim 1, 2 or 4, wherein said spacer has a surface wherein functional groups having a function of a wetting agent for said liquid crystals are introduced.

13. A normally closed liquid crystal display device according to claim 12, wherein the functional groups having a function of a wetting agent are selected from hydrocarbon groups which may have at least one hydroxyl group.

14. A normally closed liquid crystal display device according to claim 1, 2 or 4, wherein said liquid crystals contain a compound or functional groups having a function of a wetting agent for a surface of said spacer.

15. A normally closed liquid crystal display device according to claim 14, wherein said liquid crystals contain a compound having one or more cyano groups.

16. A normally closed liquid crystal display device according to claim 1, 2 or 4, wherein said liquid crystals has a surface tension of 25 mN/m or less.

17. A normally closed liquid crystal display device according to claim 16, wherein said liquid crystals contain a compound having one or more fluorine atoms as a polar group.

18. A normally closed liquid crystal display device according to claim 1, 2 or 4, wherein said spacer causes light leakage using said spacer as a center to form four-devided shapes.

19. A normally closed liquid crystal display device according to claim 1, 2 or 4, wherein said spacer causes light leakage using said spacer as a center in an amount of $1.0 \times 10^{-4}$%·mm/piece or less, when one spacer is present per $mm^2$.

20. A normally closed liquid crystal display device according to claim 17, wherein said spacer has a surface wherein functional groups having a function as a wetting agent for said liquid crystals are introduced.

* * * * *